(12) United States Patent
Hinchey et al.

(10) Patent No.: US 7,765,171 B2
(45) Date of Patent: Jul. 27, 2010

(54) SYSTEM AND METHOD OF SELF-PROPERTIES FOR AN AUTONOMOUS AND AUTOMATIC COMPUTER ENVIRONMENT

(75) Inventors: Michael G. Hinchey, Bowie, MD (US); Roy Sterritt, Newtownabbey (IE)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 736 days.

(21) Appl. No.: 11/426,853

(22) Filed: Jun. 27, 2006

(65) Prior Publication Data
US 2007/0034215 A1 Feb. 15, 2007

Related U.S. Application Data

(63) Continuation of application No. 11/251,538, filed on Sep. 29, 2005, now Pat. No. 7,627,538.

(60) Provisional application No. 60/694,817, filed on Jun. 27, 2005, provisional application No. 60/634,459, filed on Dec. 7, 2004.

(51) Int. Cl.
*G06E 1/00* (2006.01)
*G06E 3/00* (2006.01)
*G06F 15/00* (2006.01)
*G06G 7/00* (2006.01)
*G06N 99/00* (2010.01)

(52) U.S. Cl. ...................................... 706/10
(58) Field of Classification Search ...................... None
See application file for complete search history.

(56) References Cited

OTHER PUBLICATIONS

'Pulse monitoring: Extending the health check for the autonomic GRID': Sterritt, Aug. 2003, IEEE, 0-7803-8200-5, pp. 433-440.*
'The Grid: Blueprint for a new computing infrastructure': Foster, 1999, Morgan Kaufmann, pp. 61, 68.*
Sterritt,R."Towards Autonomic Computing:Effective Event Management", Proceedings of 27th Annual IEEE/NASA Goddard Software Engineering Workshop.IEEE Computer Society, Dec. 3-5, 2003, pp. 40-47, USA.

(Continued)

*Primary Examiner*—Donald Sparks
*Assistant Examiner*—Peter Coughlan
(74) *Attorney, Agent, or Firm*—Heather Goo

(57) ABSTRACT

Systems, methods and apparatus are provided through which in some embodiments self health/urgency data and environment health/urgency data may be transmitted externally from an autonomic element. Other embodiments may include transmitting the self health/urgency data and environment health/urgency data together on a regular basis similar to the lub-dub of a heartbeat. Yet other embodiments may include a method for managing a system based on the functioning state and operating status of the system, wherein the method may include processing received signals from the system indicative of the functioning state and the operating status to obtain an analysis of the condition of the system, generating one or more stay alive signals based on the functioning status and the operating state of the system, transmitting the stay-alive signal, transmitting self health/urgency data, and transmitting environment health/urgency data. Still other embodiments may include an autonomic element that includes a self monitor, a self adjuster, an environment monitor, and an autonomic manager.

17 Claims, 26 Drawing Sheets

OTHER PUBLICATIONS

Horn, P. "Autonomic Computing:IBM perspective on the state of information technology", IBM T.J. Watson Labs, NY, Agenda 2001, Oct. 15, 2001, Scottsdale, AZ, USA.

Sterritt, R. et al., "Autonomic Computing: A Means of Achieving Dependability?" Proceedings of 10th IEEE International Conference on the Engineering of Computer-Based Systems, IEEE CS Press, ECBS 03, Apr. 7-11, 2003, pp. 247-251, Huntsville, AL, USA.

IBM, "An Architectural Blueprint for Autonomic Computing", Jun. 2005, Third Ed.

Tianfield, H. "Multi-Agent Based Autonomic Architecture for Network Management", Proceedings of INDIN 2003, IEEE International Conference on Industrial Informatics, Aug. 21-24, 2003, pp. 462-469.

Sterritt, R. "Autonomic Computing", Springer-Verlag, Apr. 2005, vol. 1, Section 1.

Ganek, A.G. et al., "The Dawning of the Autonomic Computing Era", IBM Systems Journal, vol. 42, No. 1, pp. 5-18.

Sterritt, R. "Pulse Monitoring: Extending the Health-Check for the Autonomic GRID." Proceedings of IEEE Workshop on Autonomic Computing Principles and Architectures at INDIN 2003, Aug. 22-23, 2003, pp. 433-440, Alberta, Canada.

Sterritt, R. et al., "Exploring Autonomic Options in a Unified Fault Management Architecture through Reflex Reactions via Pulse Monitoring"., Proceedings of IEEE Workshop on the Engineering of Autonomic Systems at the 11th Annual IEEE International Conference on Workshops on the Engineering of Computer-Based Systems, May 24-27, 2004, pp. 449-455, Brno, Czech Repulic.

Sterritt, R. et al., "Personal Autonomic Computing Self-Healing Tool", Proceedings of IEEE Workshop on the Engineering of Autonomic Systems at 11th Annual IEEE International Conference and Workshop on the Engineering of Computer Based Systems, May 24-27, 2004, pp. 513-520, Brno, Czech Republic.

Sterrit, R. et al., "PAC-MEN: Personal Autonomic Computing Monitoring Environments", Proceedings of IEEE DEXA 2004 Workshops, 2nd Annual International Workshop on Self-Adaptive and Autonomic Computings (SAACS 04), Aug. 30-Sep. 3, 2004, pp. 737-741, Zaragoza, Spain.

Maes, P. "Concepts and Experiments in Computational Reflection", Proceedings of the International Conference on Object-Oriented Programming Systems, Languages and Applications, 1987, pp. 147-155.

Norman, D.A. et al., "Affect and Machine Design: Lessons for the Development of Autonomous Machines", IBM Systems Journal, vol. 42, No. 1, pp. 38-44.

* cited by examiner

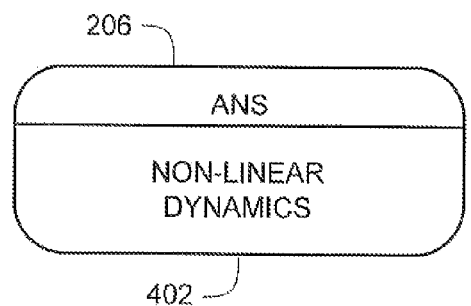
FIG. 4

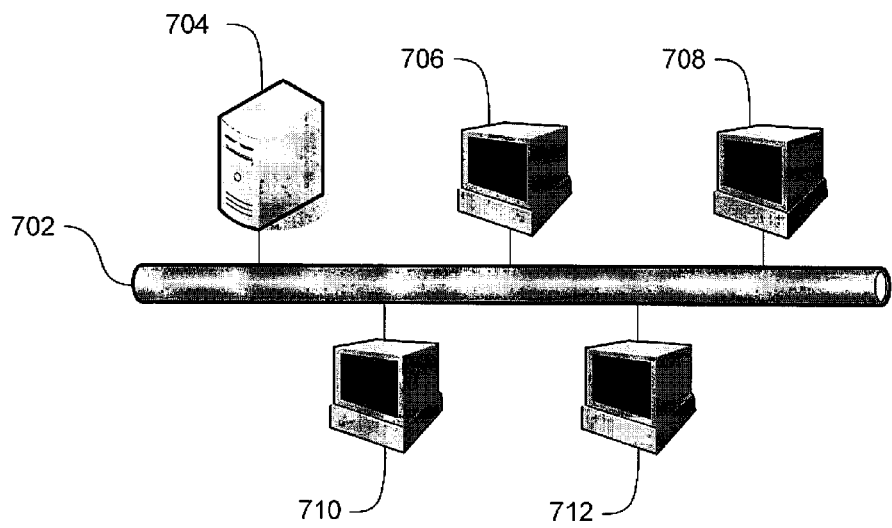

SYSTEM AND METHOD OF SELF-PROPERTIES FOR AN AUTONOMOUS AND AUTOMATIC COMPUTER ENVIRONMENT

RELATED APPLICATIONS

This application claims, under 35 U.S.C. 120, the benefit of, and is a continuation-in-part to, co-pending U.S. Original application Ser. No. 11/251,538, filed Sep. 29, 2005, entitled "SYSTEM AND METHOD FOR MANAGING AUTONOMOUS ENTITIES THROUGH APOPTOSIS," which claims the benefit of U.S. Provisional Application Ser. No. 60/634,459 filed Dec. 7, 2004 under 35 U.S.C. 119(e). This application also claims the benefit of U.S. Provisional Application Ser. No. 60/694,817 filed Jun. 27, 2005.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates generally to artificial intelligence and, more particularly, to architecture for collective interactions between autonomous entities.

BACKGROUND OF THE INVENTION

A synthetic neural system is an information processing paradigm that is inspired by the way biological nervous systems, such as the brain, process information. Biological systems inspire system design in many other ways as well, for example reflex reaction and health signs, nature inspire systems (NIS), hive and swarm behavior, and fire flies. These synthetic systems provide an autonomic computing entity that can be arranged to manage complexity, continuous self-adjustment, adjustment to unpredictable conditions, and prevention of and recovery for failures.

One key element is the general architecture of the synthetic neural system. A synthetic neural system is composed of a large number of highly interconnected processing autonomic elements that are analogous to neurons in a brain working in parallel to solve specific problems. Unlike general purpose brains, a synthetic neural system is typically configured for a specific application and sometimes for a limited duration.

Synthetic neural systems derive meaning from complicated or imprecise data and are used to extract patterns and detect trends that are too complex to be noticed by either humans or other computer techniques. A trained synthetic neural system can be thought of as an "expert" in the category of information it has been given to analyze. This expert can then be used to provide projections given new situations of interest and answer "what if" questions. Synthetic neural systems, like people, may learn by example. They may be adapted, changed and reconfigured through a learning process in which results are compared to goals and objectives, and changes are made to the synthetic neural system to conform future results of the synthetic neural system to those goals and objectives. Learning in both biological systems and synthetic neural systems involves adjustments to connections between the "neurons."

Often, autonomic elements monitor and direct each other to some extent. In conventional situations, the data that the autonomic elements monitor and use to direct can be somewhat sparse. Sparse data can increase the likelihood of incorrect directions.

In addition, systems that receive data from autonomic units can experience processing delays because the data is not in a format that can be quickly processed. Under certain challenging circumstances, the processing delay can have severe detrimental consequences.

For the reasons stated above, and for other reasons stated below which will become apparent to those skilled in the art upon reading and understanding the present specification, there is a need in the art for autonomic elements to communicate a richer set of data to each other. There is also a need to reduce processing delays in data sent from autonomic units.

BRIEF DESCRIPTION OF THE INVENTION

The above-mentioned shortcomings, disadvantages and problems are addressed herein, and will be understood by reading and studying the following specification.

In one embodiment of the invention, a method of autonomic communication is provided that may include transmitting self health/urgency data and transmitting environment health/urgency data. This data may provide a high level detail that external units can use to monitor and direct the source of the data.

In another embodiment of the invention, the self health/urgency data and the environment health/urgency data may be transmitted together on a regular periodic basis similar to the lub-dub of a heartbeat and/or with other operational status data.

In yet another embodiment, a method for managing a system based on functioning state and operating status of the system is provided and may include processing received signals from the system indicative of the functioning state and the operating status to obtain an analysis of the condition of the system, generating one or more stay alive signals based on the functioning status and the operating state of the system, transmitting the stay-alive signal, transmitting self health/urgency data, and transmitting environment health/urgency data.

In still yet another embodiment of the invention, an autonomic element may include a self monitor that is operable to receive information from sensors and operable to monitor and analyze the sensor information and access a knowledge repository, and a self adjuster operably coupled to the self monitor in a self control loop. The self adjuster may be operable to access the knowledge repository, and may be operable to transmit data to effectors, and further may be operable to plan and execute. An autonomic element may further include an environment monitor that is operable to receive information from sensors and operable to monitor and analyze the sensor information and access the knowledge repository, and an autonomic manager communications component operably coupled to the environment monitor in an environment control loop, the autonomic manager communications component operable to access the knowledge repository, the autonomic manager communications operable to produce and transmit a pulse monitor signal, the pulse monitor signal including a heart beat monitor signal and a reflex signal, the reflex signal including self health/urgency data and environment health/urgency data.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 4 is a block diagram of an autonomous neural system according to an embodiment;

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into six sections. In the first section, a system level overview is described. In the second section, apparatus are described. In the third section, hardware and the operating environments in conjunction with which embodiments may be practiced are described. In the fourth section, particular implementations are described. In the fifth section, embodiments of methods are described. Finally, in the sixth section, a conclusion of the detailed description is provided.

System Level Overview

Figure 1:
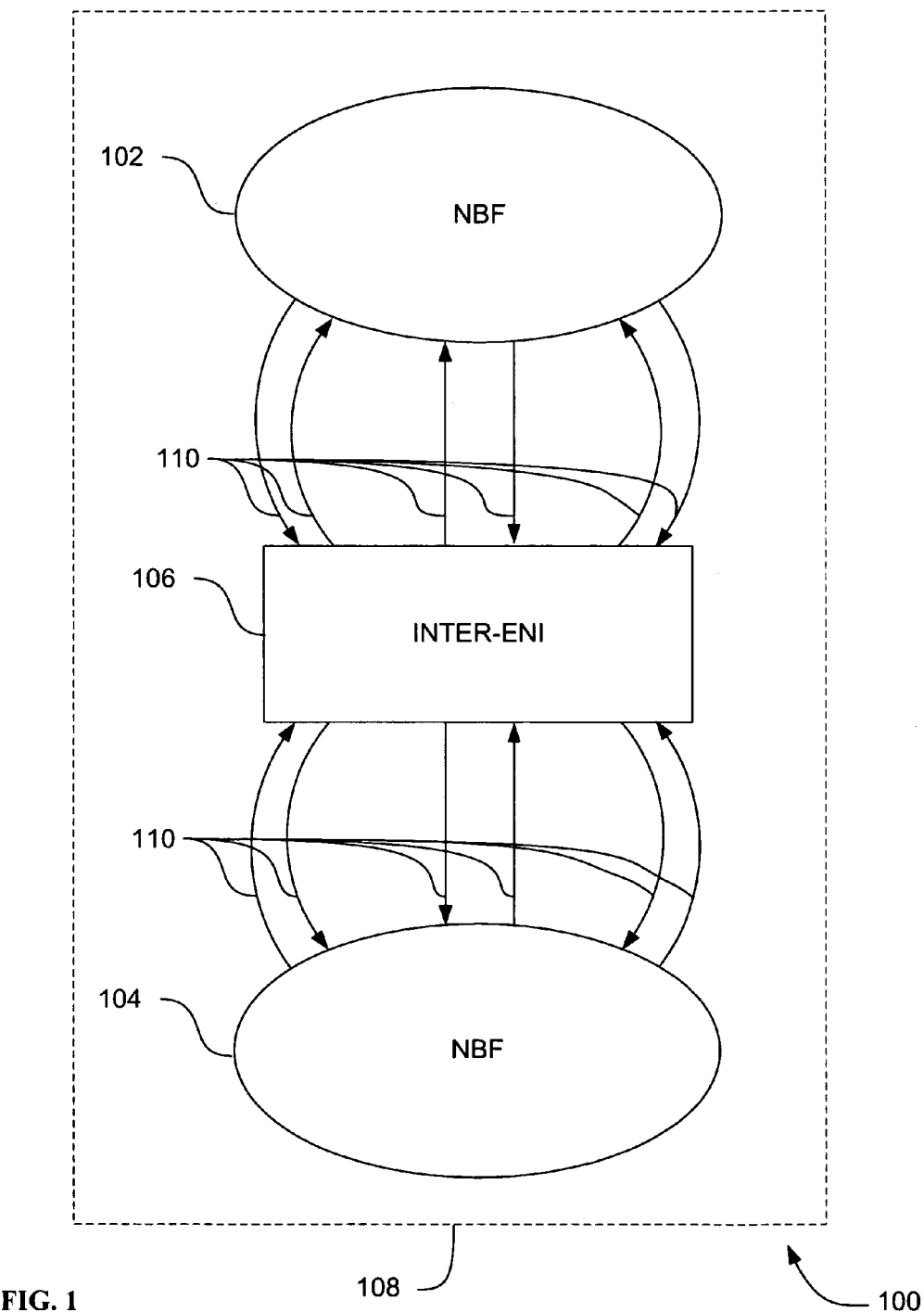
FIG. 1 is a block diagram that provides an overview of an embodiment of an evolvable synthetic neural system to manage collective interactions between autonomous entities.

FIG. 1 is a block diagram that provides an overview of an embodiment of an evolvable synthetic neural system to manage collective interactions between autonomous entities. System 100 may include a first plurality of neural basis functions (NBFs) 102 and 104. NBFs are the fundamental building block of system 100. In some embodiments of system 100, the plurality of NBFs includes more than the two NBFs 102 and 104 shown in FIG. 1. In some embodiments, system 100 includes only one NBF. One embodiment of a NBF is described below with reference to FIG. 2.

System 100 may also include a first inter-evolvable neural interface (ENI) 106 that is operably coupled to each of the first plurality of neural basis functions. The NBFs 102 and 104 may be highly integrated, and coupling between the NBFs through the ENI 106 may provide a three dimensional complexity. Thus, for example, when system 100 is implemented on microprocessors such as microprocessor 804, described below with reference to FIG. 8, system 100 may provide a synthetic neural system that reconciles the two dimensional nature of microprocessor technologies to the three dimensional nature of biological neural systems.

This embodiment of the inter-ENI 106 may be known as an inter-NBF ENI because the inter-ENI 106 is illustrated as being between or among the NBFs 102 and 104 at the same level within a hierarchy. System 100 shows only one level 108 of a hierarchy, although one skilled in the art will recognize that multiple hierarchies may be used within the scope of this invention.

System 100 may also operate autonomously. A system operates autonomously when it exhibits the properties of being self managing and self governing, often described as autonomic, pervasive, sustainable, ubiquitous, biologically inspired, organic or with similar such terms. ENI 106 may adapt system 100 by instantiating new NBFs and ENIs and establishing operable communication paths 110 to the new NBFs and the ENIs to system 100. ENI 106 may also adapt system 100 by removing or disabling the operable communication paths 110 to the new NBFs and ENIs. The adapting, establishing, removing and disabling of the communication paths 110 may be performed autonomously. Thus, system 100 may satisfy the need for a synthetic neural system that performs significant tasks with complete autonomy.

System 100 may be capable of establishing and removing links to other similarly configured systems (not shown). Thus, the system 100 may be described as self similar.

The system level overview of the operation of an embodiment is described in this section of the detailed description. Some embodiments may operate in a multi-processing, multi-threaded operating environment on a computer, such as computer 802 in FIG. 8.

While the system 100 is not limited to any particular NBF or ENI, for sake of clarity simplified NBFs and a simplified ENI are described.

Apparatus Embodiments

In the previous section, a system level overview of the operation of an embodiment is described. In this section, particular apparatus of such an embodiment are described by reference to a series of block diagrams. Describing the apparatus by reference to block diagrams enables one skilled in the art to develop programs, firmware, or hardware, including such instructions to implement the apparatus on suitable computers, executing the instructions from computer-readable media.

Figure 8:
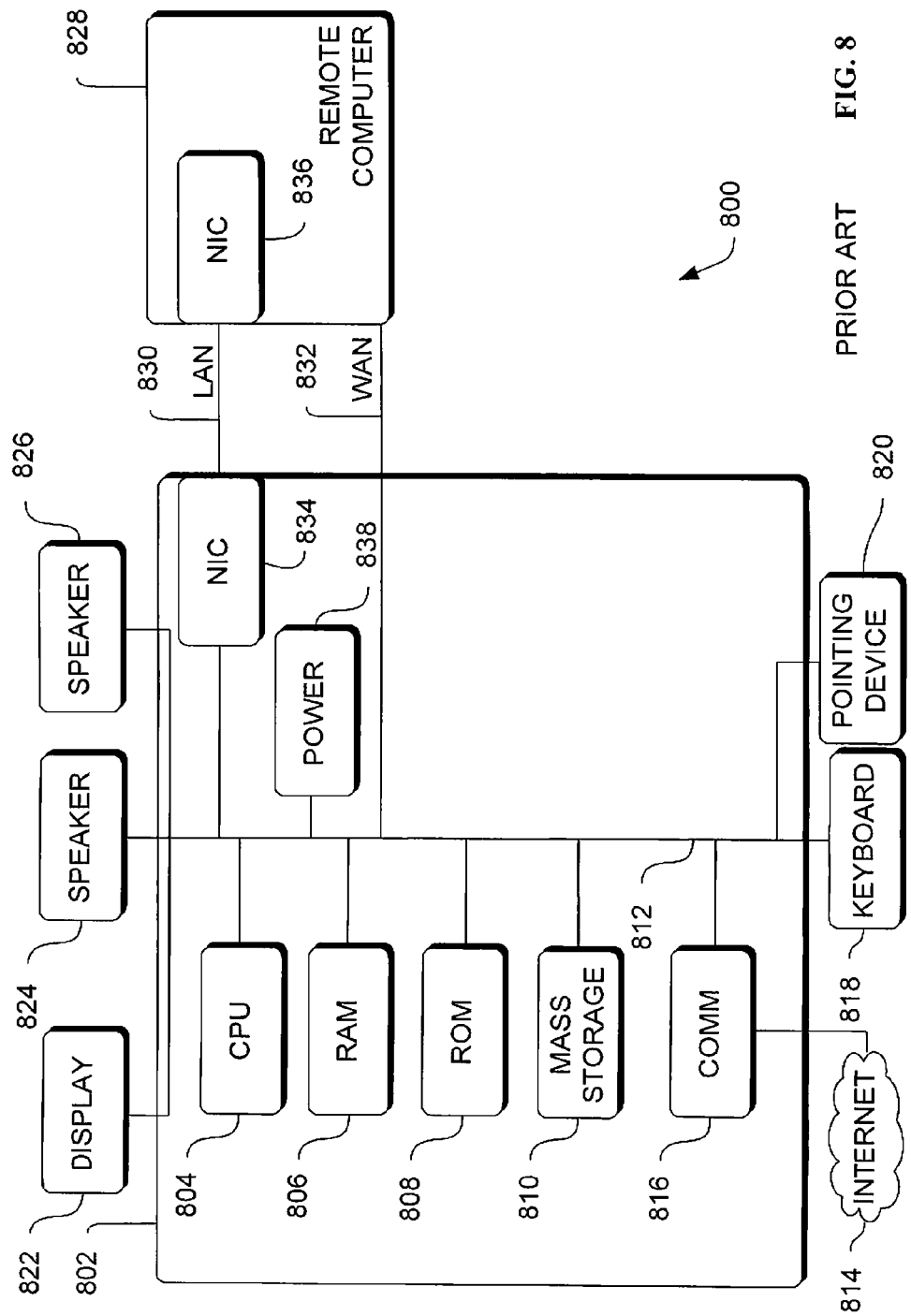
FIG. 8 is a block diagram of a conventional hardware and operating environment in which different embodiments can be practiced.

In some embodiments, apparatus 200-600 are implemented by a program executing on, or performed by firmware or hardware that is a part of a computer, such as computer 802 in FIG. 8.

Figure 2:
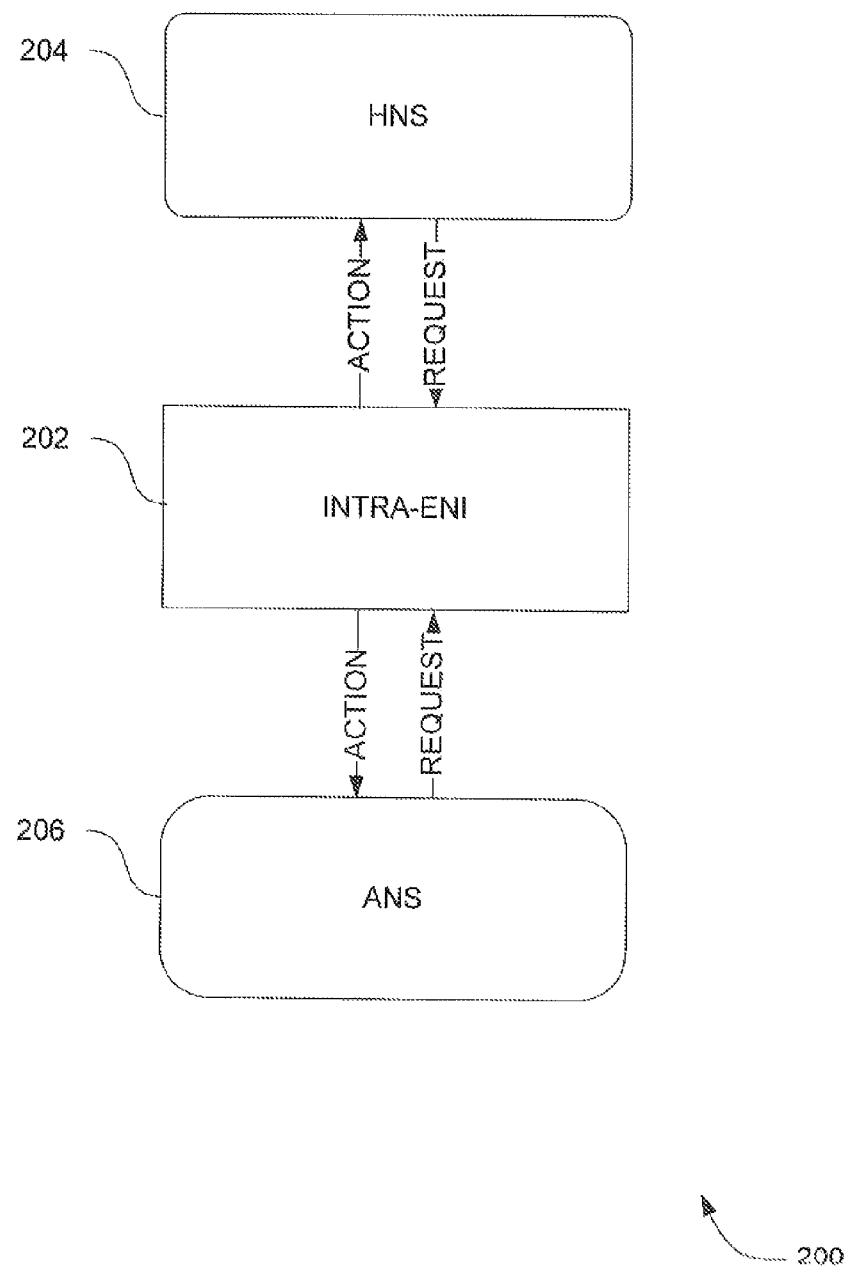
FIG. 2 is a block diagram of a neural basis function of a worker according to an embodiment.

FIG. 2 is a block diagram of a neural basis function (NBF) 200 of a worker according to an embodiment. NBF 200 is illustrated as a bi-level neural system because both high-level functions and low-level functions are performed by NBF 200.

NBF 200 may include an intra-evolvable neural interface (intra-ENI) 202. The ENI 202 may be operably coupled to a heuristic neural system (HNS) 204 and operably coupled to an autonomous neural system (ANS) 206. The HNS 204 may perform high-level functions and the ANS 206 may perform low-level functions that are often described as "motor functions" such as "motor" 1710 in FIG. 17 below. In NBF 200, the HNS 204 and the ANS 206 in aggregate may provide a function of a biological neural system. The intra-ENI 202 shown in FIG. 2 is an ENI that is wholly contained within an NBF, and is therefore prefixed with "intra."

The intra-ENI 202 may send action messages to and receive request messages from the HNS 204 and the ANS 206 during learning and task execution cycles, as well as during interfacing operations between the intra-ENI and the HNS 204 and the ANS 206 when the HNS 204 and the ANS 206 need to be modified as a result of other system failures or modification of objectives. NBF 200 is illustrated as a worker NBF because this NBF performs functions, but does not provide instructions commands to other NBFs.

Figure 3:
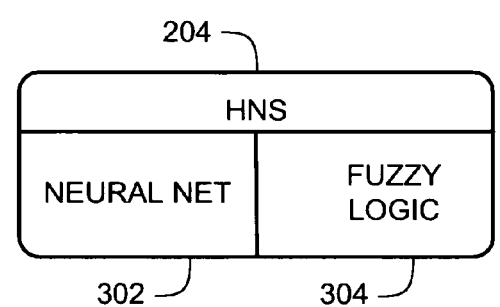
FIG. 3 is a block diagram of a heuristic neural system according to an embodiment.

FIG. 3 is a block diagram of a heuristic neural system 300 according to an embodiment.

The heuristic neural system (HNS) 300 may be composed of a neural net 302 for pattern recognition and a fuzzy logic package 304 to perform decisions based on recognitions. Taken together the neural net 302 and the fuzzy logic package 304 may form a basis for a higher level heuristic intelligence.

FIG. 4 is a block diagram of an autonomous neural system 400 according to an embodiment.

The autonomous neural system (ANS) 400 may include a non-linear dynamics simulation 402 that represents smart servo system behavior.

Figure 5:
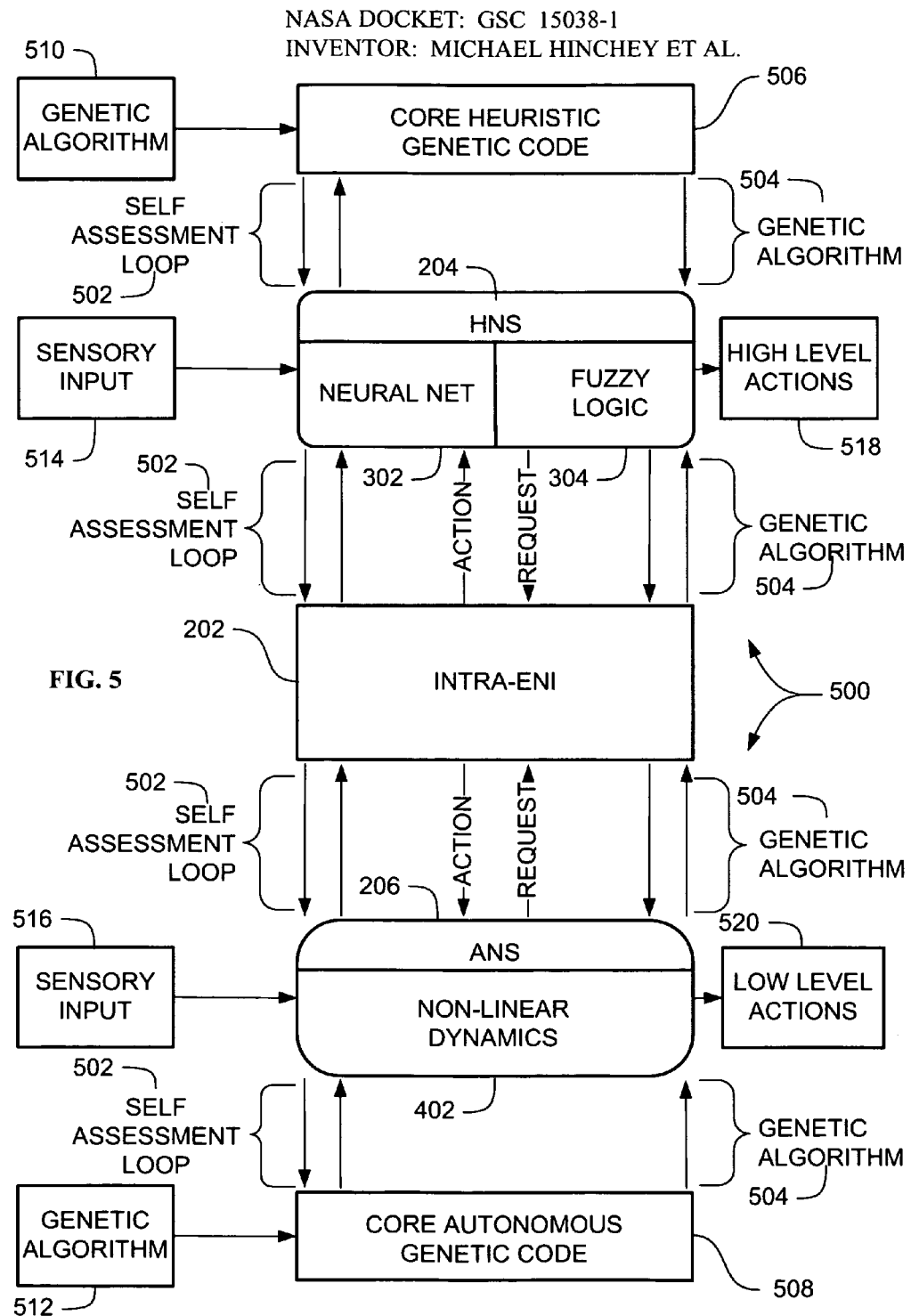
FIG. 5 is a block diagram of a neural basis function of a worker according to an embodiment.

FIG. 5 is a block diagram of a neural basis function (NBF) 500 of a worker according to an embodiment. NBF 500 is shown as a bi-level neural system.

In some embodiments, NBF 500 may include a self assessment loop (SAL) 502 at each interface between autonomic components. Each SAL 502 may continuously gauge efficiency of operations of the combined HNS 204 and ANS 206. The standards and criteria of the efficiency may be set or defined by objectives of the NBF 500.

In some embodiments, NBF 500 may also include genetic algorithms (GA) 504 at each interface between autonomic components. The GAs 504 may modify the intra-ENI 202 to satisfy requirements of the SALs 502 during learning, task execution or impairment of other subsystems.

Similarly, the HNS 204 may have a SAL 502 interface and a GA 504 interface to a core heuristic genetic code (CHGC) 506, and the ANS 206 may have a SAL 502 interface and a GA 504 interface to a core autonomic genetic code (CAGC) 508. The CHGC 506 and CAGC 508 may allow modifications to a worker functionality in response to new objectives or injury. The CHGC 506 and the CAGC 508 autonomic elements may not be part of an operational neural system, but rather may store architectural constraints on the operating neural system for both parts of the bi-level system. The CHGC 506 and the CAGC 508 may both be modifiable depending on variations in sensory inputs via GAs 504.

In some embodiments, the CHGC 506 and the CAGC 508, in conjunction with SALs 502 and GAs 504, may be generalized within this self similar neural system to reconfigure the relationship between NBFs as well as to permit the instantiation of new NBFs to increase the overall fitness of the neural system. Thus, NBF 500 may provide a form of evolution possible only over generations of NBF workers.

In some embodiments, NBF 500 may also include genetic algorithms 510 and 512 that provide process information to the CHGC 506 and the CAGC 508, respectively. HNS 204 and ANS 206 may receive sensory input 514 and 516, respectively, process the sensory input and generate high level actions 518 and low level actions 520, respectively.

Figure 6:
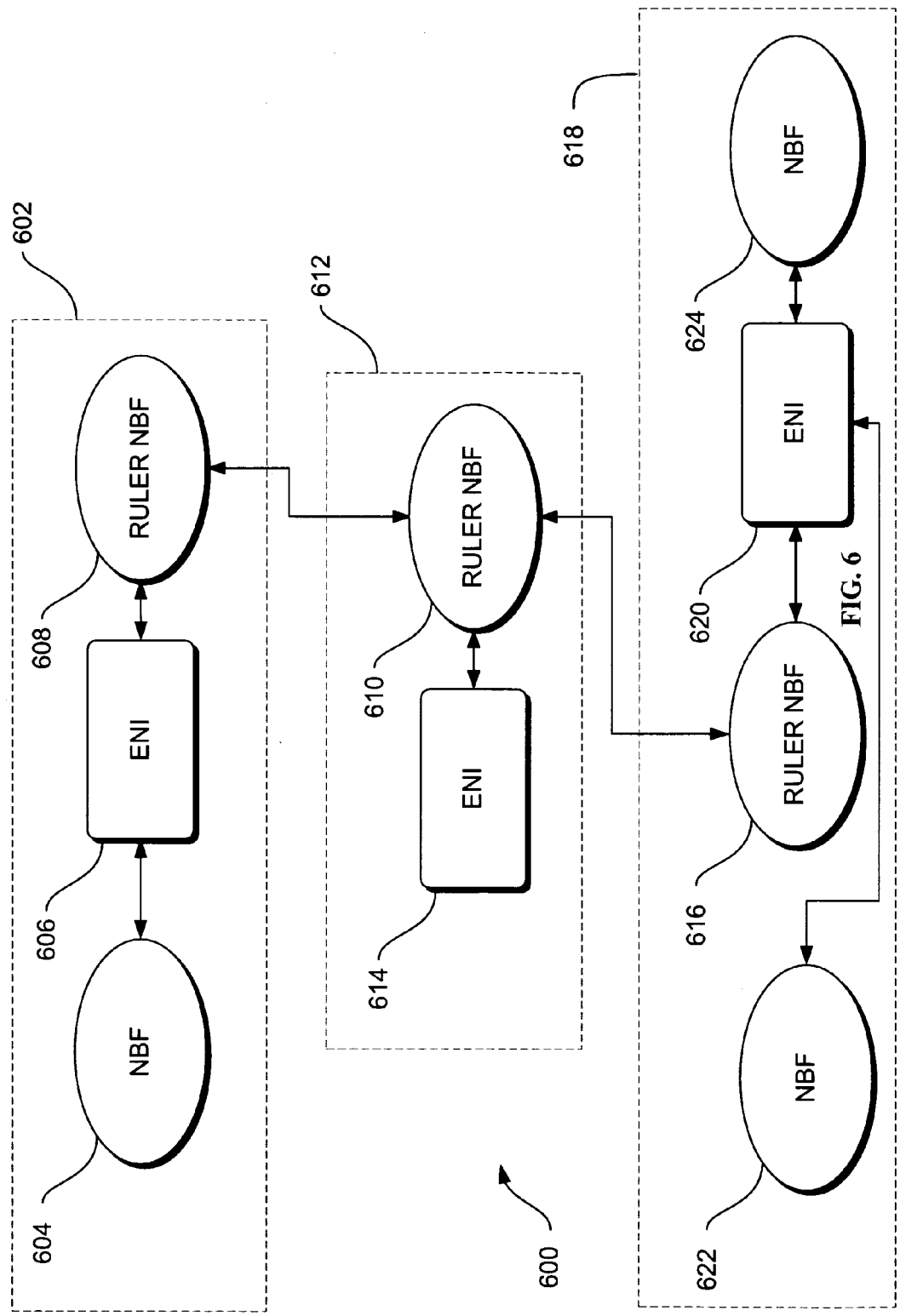
FIG. 6 is a block diagram of a multiple level hierarchical evolvable synthetic neural system according to an embodiment.

FIG. 6 is a block diagram of a multiple level hierarchical evolvable synthetic neural system (ESNS) 600 according to an embodiment.

The multiple level hierarchical ESNS 600 may include a first level of hierarchy 602 that includes NBF 604 and inter-ENI 606 and a ruler NBF 608. A ruler NBF, such as ruler NBF 608, may perform functions and also provide instructions commands to other subordinate NBFs.

The ruler NBF 608 of the first hierarchical level 602 is illustrated as being operably coupled to a ruler NBF 610 in a second hierarchical level 612. Ruler NBF 610 may perform functions, receive instructions and commands from other ruler NBFs that are higher in the hierarchy of the ESNS 600, and also provide instructions commands to other subordinate NBFs.

The second hierarchical level 612 may also include an inter-ENI 614. The second hierarchical level 612 of FIG. 6 shows an embodiment of an ESNS 600 having one NBF operably coupled to an ENI. The ruler NBF 610 of the second hierarchical level 612 may be operably coupled to a ruler NBF 616 in a third hierarchical level 618.

The third hierarchical level 616 may also include an inter-ENI 620. The third hierarchical level 616 of FIG. 6 shows an embodiment of an ESNS 600 having more than two NBFs (e.g. 616, 622 and 624) operably coupled to an ENI.

In some embodiments, the NBFs 604, 608, 610, 616, 622 and 624 may include the aspects of NBFs 102 and 104 in FIG. 1 above, and/or NBF 200 in FIG. 2 above. One skilled in the art will appreciate that many combinations exist that fall within the purview of this invention.

Hardware and Operating Environments

Figure 7:
FIG. 7 is a block diagram of a conventional computer cluster environment in which different embodiments can be practiced.
Figure 9:
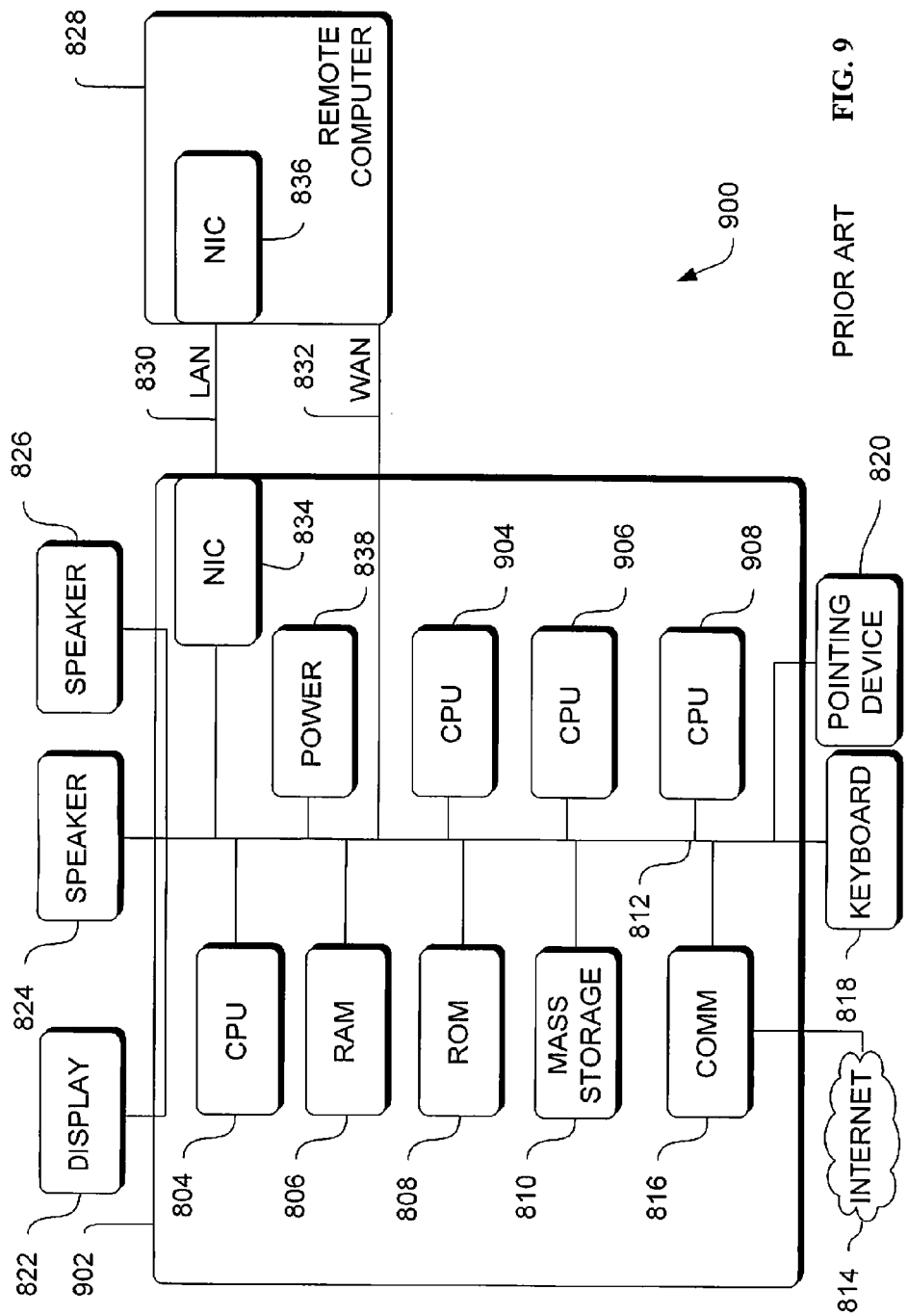
FIG. 9 is a block diagram of a conventional multiprocessor hardware and operating environment 900 in which different embodiments can be practiced.

FIGS. 7, 8 and 9 are diagrams of hardware and operating environments in which different embodiments can be practiced. The description of FIGS. 7, 8 and 9 provide an overview of computer hardware and suitable autonomic computing environments in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server autonomic computing environments where remote devices that perform tasks are linked through a communications network. Program modules may be located in both local and remote memory storage devices in a distributed autonomic computing environment. Those skilled in the art will know that these are only a few of the possible computing environments in which the invention may be practiced and therefore these examples are given by way of illustration rather than limitation.

FIG. 7 is a block diagram of a standard prior art computer cluster environment 700 in which different embodiments can be practiced. System 100, apparatus 200, 300, 400, 500, 600, method 1900 and ESNS 1000 and 1100 can be implemented on computer cluster environment 700.

Computer cluster environment 700 may include a network 702, such as an EtherFast 10/100 backbone, that is operably coupled to a cluster server 704 and a plurality of computers 706, 708, 710 and 712. One possible embodiment of the computers is computer 802 described below with reference to FIG. 8. The plurality of computers can include any number of computers, but some implementations may include 7, 16, 32 and as many as 512 computers. The ESNSs and NBFs described above can be distributed on the plurality of computers.

One example of the computer cluster environment 700 is a Beowolf computer cluster. The computer cluster environment 700 provides an environment in which a plurality of ESNSs and NBFs can be hosted in an environment that facilitates cooperation and communication between the ESNSs and the NBFs.

FIG. 8 is a block diagram of a hardware and operating environment 800 in which different embodiments can be practiced. Computer 802 may include a processor 804, commercially available from Intel, Motorola, Cyrix and others. Computer 802 may also include random-access memory (RAM) 806, read-only memory (ROM) 808, and one or more mass storage devices 810, and a system bus 812, that operatively couples various system components to the processing unit 804. The memory 806, 808, and mass storage devices, 810, are illustrated as types of computer-accessible media. Mass storage devices 810 may be more specifically types of nonvolatile computer-accessible media and can include one or more hard disk drives, floppy disk drives, optical disk drives, and tape cartridge drives. The processor 804 can execute computer programs stored on the computer-accessible media.

Computer 802 may be communicatively connected to the Internet 814 via a communication device 816. Internet 814 connectivity is well known within the art. In one embodiment, a communication device 816 may be a modem that responds to communication drivers to connect to the Internet via what is known in the art as a "dial-up connection." In another embodiment, a communication device 816 may be an Ethernet® or similar hardware network card connected to a local-area network (LAN) that itself is connected to the Internet via what is known in the art as a "direct connection" (e.g., T1 line, etc.).

A user may enter commands and information into the computer 802 through input devices such as a keyboard 818 or a pointing device 820. The keyboard 818 may permit entry of textual information into computer 802, as known within the art, and embodiments are not limited to any particular type of keyboard. Pointing device 820 may permit the control of the screen pointer provided by a graphical user interface (GUI) of operating systems such as versions of Microsoft Windows®. Embodiments are not limited to any particular pointing device 820. Such pointing devices may include mice, touch pads, trackballs, remote controls and point sticks. Other input devices (not shown) could include a microphone, joystick, game pad, satellite dish, scanner, or the like.

In some embodiments, computer 802 may be operatively coupled to a display device 822. Display device 822 may be connected to the system bus 812. Display device 822 permits the display of information, including computer, video and other information, for viewing by a user of the computer. Embodiments are not limited to any particular display device 822. Such display devices may include cathode ray tube (CRT) displays (monitors), as well as flat panel displays such as liquid crystal displays (LCDs). In addition to a monitor, computers may typically include other peripheral input/output devices such as printers (not shown). Speakers 824 and 826 provide audio output of signals. Speakers 824 and 826 may also connected to the system bus 812.

Computer 802 may also include an operating system (not shown) that could be stored on the computer-accessible media RAM 806, ROM 808, and mass storage device 810, and may be executed by the processor 804. Examples of operating systems include Microsoft Windows®, Apple MacOS®, Linux®, UNIX®. Examples are not limited to any particular operating system, however, and the construction and use of such operating systems are well known within the art.

Embodiments of computer 802 are not limited to any type of computer 802. In varying embodiments, computer 802 may comprise a PC-compatible computer, a MacOS®-compatible computer, a Linux®-compatible computer, or a UNIX®-compatible computer. The construction and operation of such computers are well known within the art.

Computer 802 may be operated using at least one operating system to provide a graphical user interface (GUI), including a user-controllable pointer. Computer 802 may have at least one web browser application program executing within at least one operating system, to permit users of computer 802 to access an intranet, extranet or Internet world-wide-web pages as addressed by Universal Resource Locator (URL) addresses. Examples of browser application programs include Netscape Navigator® and Microsoft Internet Explorer®.

The computer 802 may operate in a networked environment using logical connections to one or more remote computers, such as remote computer 828. These logical connections may be achieved by a communication device coupled to, or a part of, the computer 802. Embodiments are not limited to a particular type of communications device. The remote computer 828 could be another computer, a server, a router, a network PC, a client, a peer device or other common network node. The logical connections depicted in FIG. 8 include a local-area network (LAN) 830 and a wide-area network (WAN) 832. Such networking environments are commonplace in offices, enterprise-wide computer networks, intranets, extranets and the Internet.

When used in a LAN-networking environment, the computer 802 and remote computer 828 may be connected to the local network 830 through network interfaces or adapters 834, which is one type of communications device 816. Remote computer 828 may also include a network device 836. When used in a conventional WAN-networking environment, the computer 802 and remote computer 828 may communicate with a WAN 832 through modems (not shown). The modem, which can be internal or external, is connected to the system bus 812. In a networked environment, program modules depicted relative to the computer 802, or portions thereof, can be stored in the remote computer 828.

Computer 802 may also include power supply 838. Each power supply can be a battery.

FIG. 9 is a block diagram of a multiprocessor hardware and operating environment 900 in which different embodiments may be practiced. Computer 902 may include a plurality of microprocessors, such as microprocessor 804, 904, 906, and 908. The four microprocessors of computer 902 may be one example of a multi-processor hardware and operating environment; other numbers of microprocessors may be used in other embodiments.

Similar to the computer cluster environment 700 in FIG. 7 above, the computer 902 may provide an environment in which a plurality of ESNSs and NBFs can be hosted in an environment that facilitates cooperation and communication between the ESNSs and the NBFs.

Components of the system 100, apparatus 200, 300, 400, 500, 600, 1000, 1100, 1200, 1300, 1400, 1500, 1600, 1700 and 1800 and methods 1900, 2000, 2100, 2200, 2300, 2400 and 2500 may be embodied as computer hardware circuitry or as a computer-readable program, or a combination of both.

More specifically, in one computer-readable program embodiment, the programs can be structured in an object-orientation using an object-oriented language such as Java, Smalltalk or C++, and the programs can be structured in a procedural-orientation using a procedural language such as COBOL or C. The software components may communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components may execute on as few as one computer as in computer 802 in FIG. 8, or on at least as many computers as there are components.

Figure 10:
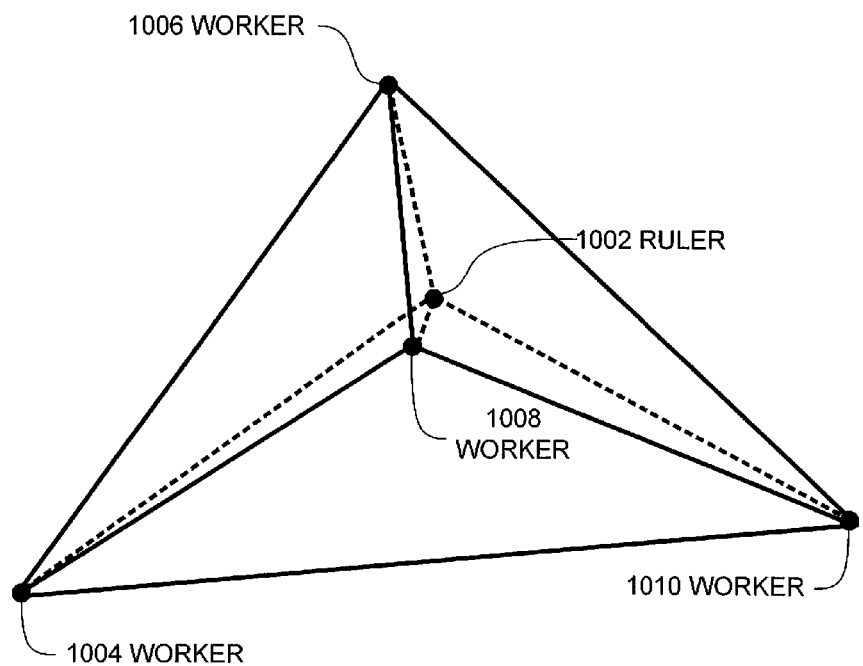
FIG. 10 is a diagram of a three dimensional hierarchical evolvable synthetic neural system according to an embodiment.

Implementation of an Evolvable Synthetic Neural System in a Tetrahedral Architecture Referring to FIG. 10, a particular three-dimensional implementation is described in conjunction with the system overview in FIG. 1 and the apparatus described in FIG. 6.

FIG. 10 is a diagram of a three dimensional (3D) hierarchical evolvable synthetic neural system (ESNS) 1000 according to an embodiment.

The 3D hierarchical ESNS 1000 may include a ruler subsystem 1002 and four worker subsystems 1004, 1006, 1008 and 1010. Each subsystem in the 3D hierarchical ESNS 1000 may include one or more ESNSs such as system 100 or ESNS 600.

The three dimensional architecture of 3D hierarchical ESNS 1000 may provide a three dimensional complexity. An implementation of ESNS 600 on a microprocessor such as microprocessor 804 described below with reference to FIG. 8, may provide a synthetic neural system that reconciles the two dimensional nature of microprocessor technologies to the three dimensional nature of biological neural systems.

Implementation of Single Instrument Spacecraft to Prospect Asteroid Belts

Figure 11:
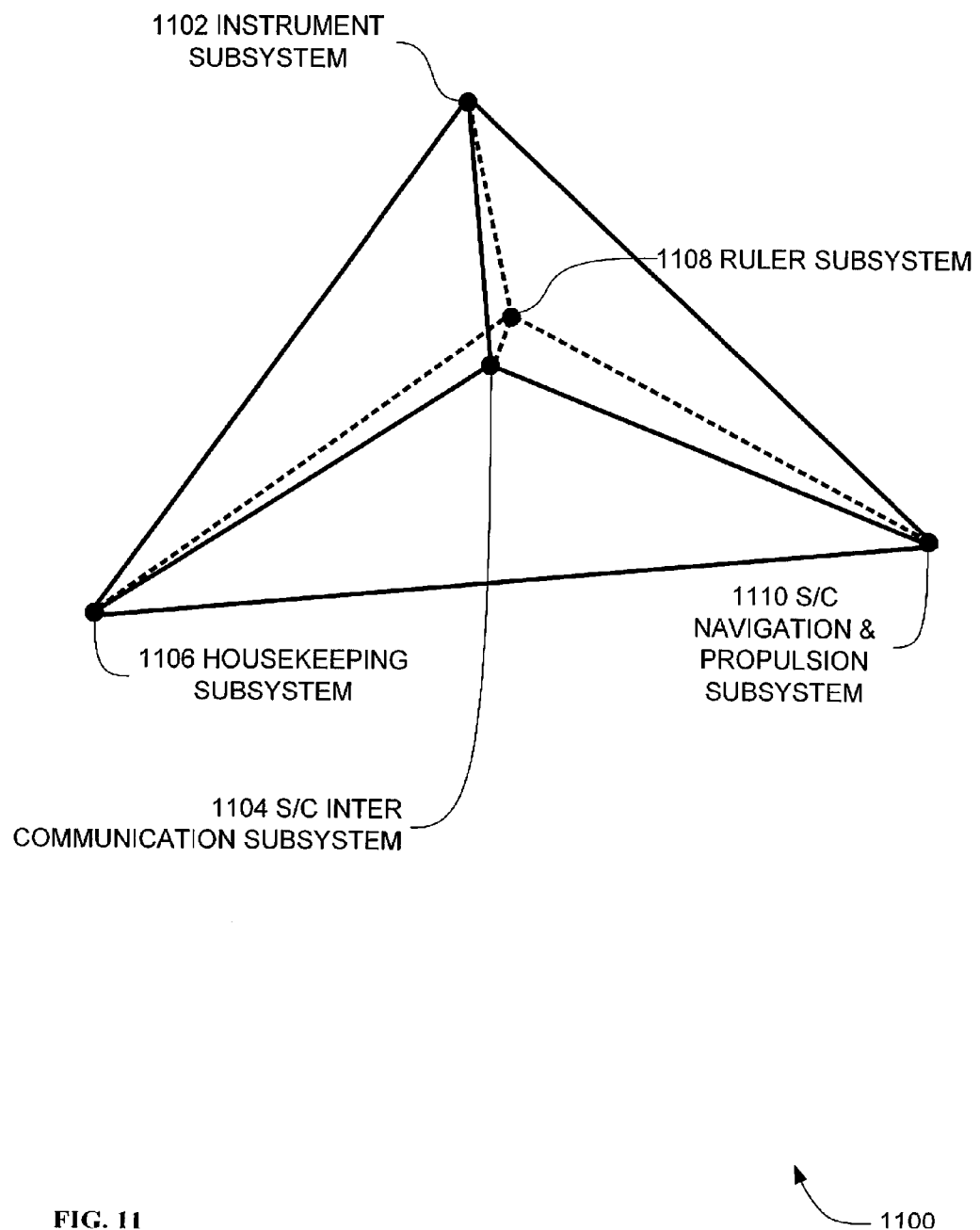
FIG. 11 is a diagram of a heuristic neural system according to an embodiment for a single instrument spacecraft to prospect asteroid belts.

Referring to FIG. 11, a particular three-dimensional implementation for asteroid prospecting is described in conjunction with the system overview in FIG. 1 and the apparatus described in FIG. 6.

FIG. 11 is a diagram of a heuristic neural system (HNS) 1100 according to an embodiment for a single instrument spacecraft to prospect asteroid belts.

Each spacecraft may be controlled by a subset of NBFs (SNBF) which in aggregate may provide the behavior of a subsystem of the mission. For example, a solar sailing SNBF 1102 may control sail deployment and subsequent configuration activity much as terrestrial sailors perform navigation and manage propulsion. A spacecraft inter communication subsystem SNBF 1104 may control communication with other workers and rulers. Also a housekeeping SNBF 1106 may control the spacecraft housekeeping. HNS 1100 may also include a ruler subsystem 1108 to coordinate all activities. Similarly, a spacecraft navigation and propulsion subsystem 1110 may control the navigation and propulsion, matching the navigation and propulsion to the current objectives.

In one embodiment, each spacecraft could be a worker in a totally autonomous space mission. The space mission may be configured as an autonomous nanotechnology swarm (ANTS). Each spacecraft in an ANTS may be assigned a specialized mission, much like ants in an ant colony have a specialized mission. Yet, the HNS architecture of each worker in an ANTS may provide coordination and interaction between each HNS that yields performance of the aggregate of the ANTS that exceeds the performance of a group of generalist workers.

More specifically, the SNBFs within HNS 1100 may have a hierarchical interaction among themselves much as the workers do in the entire ANTS collective. Hence, although many activities of the spacecraft could be controlled by individual SNBFs, a ruler SNBF may coordinate all of the SNBFs to assure that spacecraft objectives are met. Additionally, to have redundancy for the s/c mission, inactive workers and rulers may only participate if a member of their type is lost. In addition, a hierarchical worker node can collapse to a non-hierarchical one, if all of the available sub-rulers for that node are lost.

In one particular application of an ANTS, a prospecting asteroid mission (PAM) may survey a large population or surface area targets, such as main belt asteroids. The primary objective of a PAM could be exploration of the asteroid belt in search of resources and material with astrobiologically relevant origins and signatures. The PAM may include a swarm of approximately 1000 spacecraft that includes approximately 10 types of specialist workers (e.g. HNS 1100) with a common spacecraft bus that is organized into 10 subswarms of approximately 100 spacecraft each, having approximately 10 specialist HNSs.

In some embodiments, each individual spacecraft in a PAM may weigh 1 kilogram or less with one meter diameter bodies and 100 meter$^2$ sails when fully deployed. Each spacecraft may be packaged into a 10 cm² sided cube. A swarm of 1000 of these spacecraft may fit into 1 meter³ weighing 1000 kilograms in deployment. Each spacecraft may also include a solar sail propulsion system that requires no expendable supplies and a small nuclear battery that provides sufficient power to each worker. Thus, the prospecting asteroid mission may be self-directed and can possibly be self-sustaining for tens of years.

Figure 12:
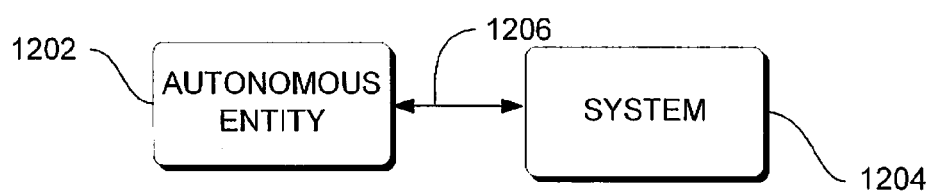
FIG. 12 is a diagram of an autonomous entity managing a system according to an embodiment.

FIG. 12 is a block diagram of an autonomic entity management system 1200 according to an embodiment. The system 1204 is a generic system because it represents a myriad of devices, processes, or device and process that perform a task in accordance to its programming or design. The system 1204 could be software for updating or for synchronizing a file, could be a worker craft containing unique instrument for data gathering in an autonomous nano-technology swarm, or the system 1204 could be an application for managing resources in networks or general purpose computers. The system 1204 can have multiple applications and capabilities such as self healing and self monitoring, but as a minimum, the system 1204 is required to have a way for communicating a functional status and operating state signal to the managing autonomous entity manager 1202. The system 1204 may exhibit the properties of being self managing and self governing, often termed autonomic, pervasive, sustainable, ubiquitous, biologically inspired, organic or with similar such terms.

While the autonomic entity management system 1200 is shown as discrete autonomic components it should be understood that autonomic computing is dependent on many disciplines for its success; not least of these is research in agent technologies. The autonomic manager 1202 or system 1204 can be agents themselves containing functionality for measurement and event correlation and support for policy based control.

The functional status may be represented by a heart beat monitor (HBM) signal that indicates that the system 1204 is still functioning as designed. The HBM signal is fundamentally an "I am alive" signal to the autonomic manager, such as autonomic entity 1202, indicating that the system is functioning. These signals can be communicated from system 1204 through an appropriate bidirectional communication link 1206. The response from the autonomous manager 1202 can use the same link to influence system 1204. The communication link can be one or more radio link, data bus, a call procedure when implemented as software, or any other link presently existing or to be developed for facilitating communication between autonomic elements.

The operating state signal may be represented by a pulse monitor (PBM) signal. The PBM signal can be used by the autonomic entity 1202 or autonomic manager to infer potential warning conditions so preparations can be made to handle changing processing loads, impact on mission objectives, planning for correction, and possible substitute or reassignment of role or functionality to perform the desired objectives of system 1204. Autonomous manager 1202 has the additional option of generating a stay alive signal that can be used to safeguard resources, safeguard the completion of the objectives, and safeguard the system 1204 by removing the offending agent or the sub-component of system 1204. The stay alive signal borrows from the process of apoptosis in biological systems for cell self-destruction to maintain growth and protect the biological system from catastrophe. In biological systems, self-destruct is an intrinsic property that is delayed due to the continuous receipt of biochemical reprieves. The process is referred to as apoptosis, meaning drop out due to the origin of the word derived dropping of leaves from trees; i.e., loss of cells that ought to die in the midst of the living structure. This process has also been nicknamed death by default, where cells are prevented from putting an end to themselves due to constant receipt of biochemical stay alive signals. In the present arrangement, self-destruction may be usable in preventing race conditions and undesirable emergent behavior that have been shown to influence system performance and thus mission objectives. While self-destruction can be viewed as a last resort situation to prevent further damage; in other situations, such as security of the agent or system 1204, self-destruction can be used as an intrinsic part of the process such as blocking the autonomic entity from communicating or using the resources of the system.

Figure 13:
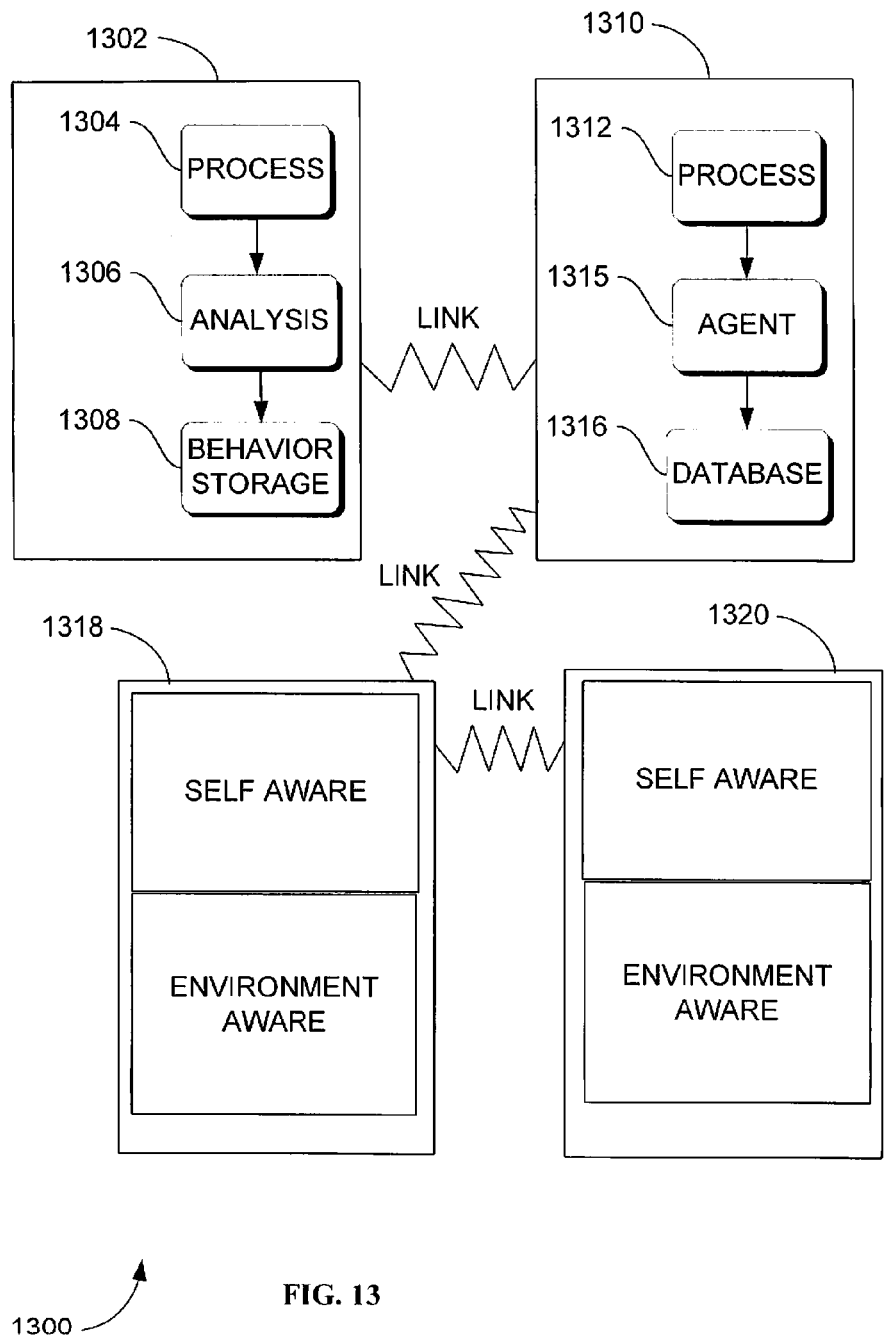
FIG. 13 is a diagram of autonomous entities interaction according to an embodiment.

FIG. 13 is a diagram representation of a plurality of autonomic entities that have been assembled to perform a task. These entities may be Self-configuring: adapt automatically to dynamically changing environments; Self-optimizing: monitor and tune resources automatically; Self-protecting: anticipate, detect, identify, and protect against attacks from anywhere; and, Self-healing: discover, diagnose, and react to disruptions As shown with reference to autonomic entities 1318 and 1320 autonomic computing may have a self-aware layer and an environment aware layer. The self-aware layer of the autonomic entity (agent or other) may be comprised of a managed component and autonomic manager, which can be an agent, termed a self-managing cell (SMC). Control loops with sensors (self-monitor) and effectors (self-adjuster) together with system knowledge and planning/adapting policies may allow the autonomic entities to be self aware and to self manage. A similar scheme may facilitate environment awareness—allowing self managing if necessary, but without the immediate control to change the environment; this could be affected through communication with other autonomic managers that have the relevant influence, through reflex or event messages. The autonomic entities may be arranged or assigned distinctive roles, such as worker entities, coordinating or managing entities, and message entities. Based on the task, a ruler entity could be assigned a set of worker entities to manage inclusive of determining if a stay alive signal ought to be withdrawn. Further, the communication between the ruler and the worker may be facilitated through the message entity. The message entity could have the additional task of communicating with a remote system. In the case of space exploration, the remote system could be mission control on earth, mission control on an orbital platform, or any other arrangement that can facilitate that is external to the collection of autonomic elements. It is foreseeable that the remote system could be an autonomic entity acting like the project manager for the mission. Communication with mission control will be limited to the download of science data and status information. An example of such a grouping is shown in FIG. 13 where autonomic entity 1302 is shown as a ruler entity, autonomic entity 1310 as a message entity, and autonomic entities 1318 and 1320 are examples of worker entities. In terms of hardware, these entities can be all identical with the discernable difference being programming to accomplish assigned tasks. An added advantage to having identical hardware is replacing failed entities, which can be accomplished by activating software code found in the autonomic entity. If hardware differences exist, they can be based on specialized equipment suitable for a particular task. However, at a minimum, certain functions or roles, such as ruler and messenger, may be expected to be within the skill set of all the autonomic entities.

As shown in FIG. 13, ruler autonomic entity 1302 may comprise a program or process 1304 executing in ruler entity

1302. Ruler entity 1302 can be implemented using a data processing system, such as data processing system 902 in FIG. 9, or in the form of an autonomous agent compiled by a data processing system. In the alternative, the ruler entity could be an autonomous nano-technology swarm that is launched from a factory ship for exploring planets, asteroids, or comets. Further, analysis module 1306 or agent as executed by ruler entity 1302 can be used to monitor process 1302 and to receive pulse monitor and heart beat monitor signals from worker entities through the messenger entity. When analysis module 1306 is used to monitor process 1304 it may be to detect errors or problems with the operation of process 1304.

As shown in FIG. 13, analysis agent 1306 can include an evaluator or other monitoring engine used to monitor the operation of process 1304. Analysis agent 1306 may be executed in response to some event. This event can be a periodic event, such as the passage of some period of time or data received from one or more of the worker entities. Further, the event can be the initialization of internal procedures in process 1304 or the starting or restarting of ruler entity 1302. Depending on the particular implementation, analysis agent 1306 can continuously run in the background monitoring process 1304 and analyzing the worker entity signals. See method 2000 in FIG. 20 below for actions taken by analysis agent module 1306 in formulating a strategy for the worker entities. Further, analysis agent 1306 may be subject to any self-healing routines found in ruler entity 1302.

This monitoring by analysis agent 1306 may be based on rules stored in behavior storage 1308, which could be used to compare the actual behavior of the received data to an expected behavior as defined in behavior storage 1308. In the present arrangement, behavior storage 1308 (ruler entity 1302) may be a collection of rules that can be updated by a remote computer through the messenger entity that reflects most current fixes (self-healing) or repair procedures and responses to worker entities upon the occurrence of an event, change in condition, or deviation from a normal operation. Behavior storage 1308 can be narrowly tailored based on the use and purpose of the autonomic entity, such as messenger entity 1310, and have only those procedures needed to perform its programming.

When messenger entity connects to remote computer at a command and control station, database 1316 can be updated with information that can later be used to program ruler entity or worker entity. In most cases, a copy of the rules in database 1316 contains the most up-to-date information. If the objective changes or a solution to a problem requires an updated version not found within the autonomic entity, the entities may attempt to contact message entity 1310 to see if more recent or up-to-date information is available. If updates are available, these updates may be sent to the requesting entity for processing.

The information in behavior storage 1308 and databases in messenger and worker entity can include an array of values that are expected when selected process or operations are implemented in the respective entity. Examples processes may be initializing software, timing requirements, synchronization of software modules, and other metrics that can provide information concerning the running of a process within the respective entity. Examples operations may be data gathering, processing of information, controlling machinery, or any other operation where data processing systems are employed. These expected values can be compared to determine if an error condition has occurred in the operation of the entity. An error condition can be analyzed to determine its causes and possible correction. In the case of a worker entity, the error can be internally analyzed to select the appropriate self-healing procedure and the error can be sent to the ruler entity to be analyzed by analysis agent 1306 using the rules in behavior storage 1308. Based on the analysis, the ruler entity can elect to either withdraw the stay alive signal to the malfunctioning worker entity or wait a selected period to generate one or more stay alive signal, withdrawal of a stay alive signal, or a self-destruct signal. If the stay alive signal is withdrawn, the malfunctioning entity could be disconnected from the operation and the task assigned to another entity or partially performed by the remaining entity to insure its completion.

Figure 14:
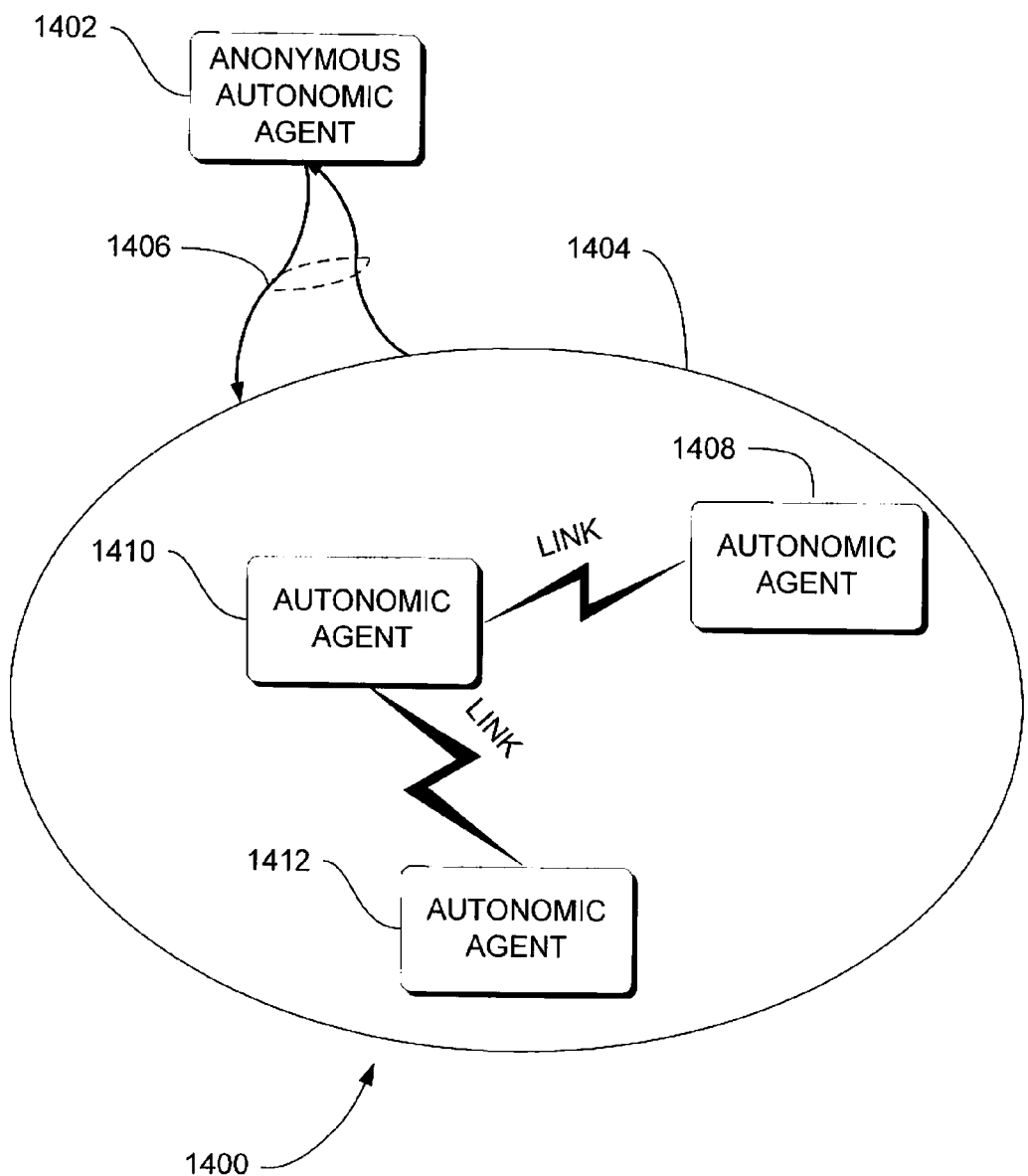
FIG. 14 is a block diagram of an autonomous entity management system 1400 according to an embodiment.

FIG. 14 is a block diagram of an autonomous entity management system 1400 according to an embodiment. The system 1400 may be a generic system because it represents a myriad of devices, processes, or device and process that perform a task in accordance to its programming or design. The illustrated system 1400 represents an instance when an autonomous system 1404 encounters an anonymous autonomic agent 1402. An anonymous autonomous agent can be a visiting agent, a mobile agent that can enter the sphere of influence of the autonomous system 1404, or any device for which the autonomous system 1404 has no established relationship. Example encounters may be a wireless device (agent) and communication tower (system), a client and server, a video subscriber and video provider, and a process and an operating system. System 1400 may solve the need in the art for management of autonomous entities that can be functionally extracted from an environment upon the occurrence of a predetermined condition such as a potential security breach.

The autonomous system 1404 may comprise one or more autonomic agents 1408, 1410, and 1412 all performing assigned functions and roles. As noted earlier, roles can be a combination of ruler, messenger, and worker. Functions may be data gathering, communication functions, scheduling, controlling, security, and so forth. Upon detecting anonymous autonomic agent 1402, the assigned autonomous agent for performing security functions for autonomous system 1404 may interrogate the anonymous autonomic agent 1402, requesting production of valid credentials. It should be noted at this point that detection can occur by employing various schemes, such as when the anonymous autonomic agent 1402 requests resources from the system 1404, or from any autonomic entity that forms part of the system, response to polling signals from the autonomous system 1404, or through a friend or foe signal that indicates the presence of an anonymous entity 1402 in proximity to the autonomous system 1404.

To the autonomous system 1404, security may be important because of compromises by the accidental misuse of hosts by agents, as well as the accidental or intentional misuse of agents by hosts and agents by other agents. The result may be damage, denial-of-service, breach-of-privacy, harassment, social engineering, event-triggered attacks, or compound attacks. To prevent security breaches it may be important to ensure that visiting agents have valid and justified reasons for being there as well as providing security to the visiting agent with interaction with other agents and host. Upon detection the visiting agent 1402 may be sent an asynchronous ALice signal (Autonomic license) 1406 requiring valid credentials from the agent 1402. The anonymous agent 1402 may need to work within the autonomic system 1404 to facilitate self-management, and accordingly the anonymous agent 1402 and its host may need to be able to identify each other's credentials through such an ALice signal. The autonomic system 1404 can establish certain response characteristics for the returned signal from the agent 1402. For example, the autonomic system 1404 can require a response in an appropriate format, within a certain timeout period, and with a valid and justified reason for being within the locust of interest or domain of the autonomous system 1404. For protection the autonomic system 1404 may make an assessment of the quality of the response from the anonymous agent 1402 to ascertain the potential of the agent for causing harm to the autonomous system 1404. Based on this determination the autonomous system 1404 can control the type of interaction with the agent 1402. The agent can be destroyed, blocked, partially blocked, stay alive signal withdrawn, or allowed to communicate with other agents within the autonomous system 1404. The protection can be triggered at any level of infraction or by a combination of infractions by the anonymous autonomous agent 1402 when responding to the ALice signal. If agent 1402 fails to identify itself appropriately following an ALice interrogation, the agent 1402 may be blocked from the system and given either a self-destruct signal, or its "stay alive" reprieve is withdrawn. The consequence of unacceptable response to an anonymous agent 1402, should it fail to do so within a timeout period, the agent 1402 may be determined to be an intruder or other invalid agent (process) and consequently destroyed and/or excluded from communicating with other agents 1408, 1410, 1412 in the system.

Figure 15:
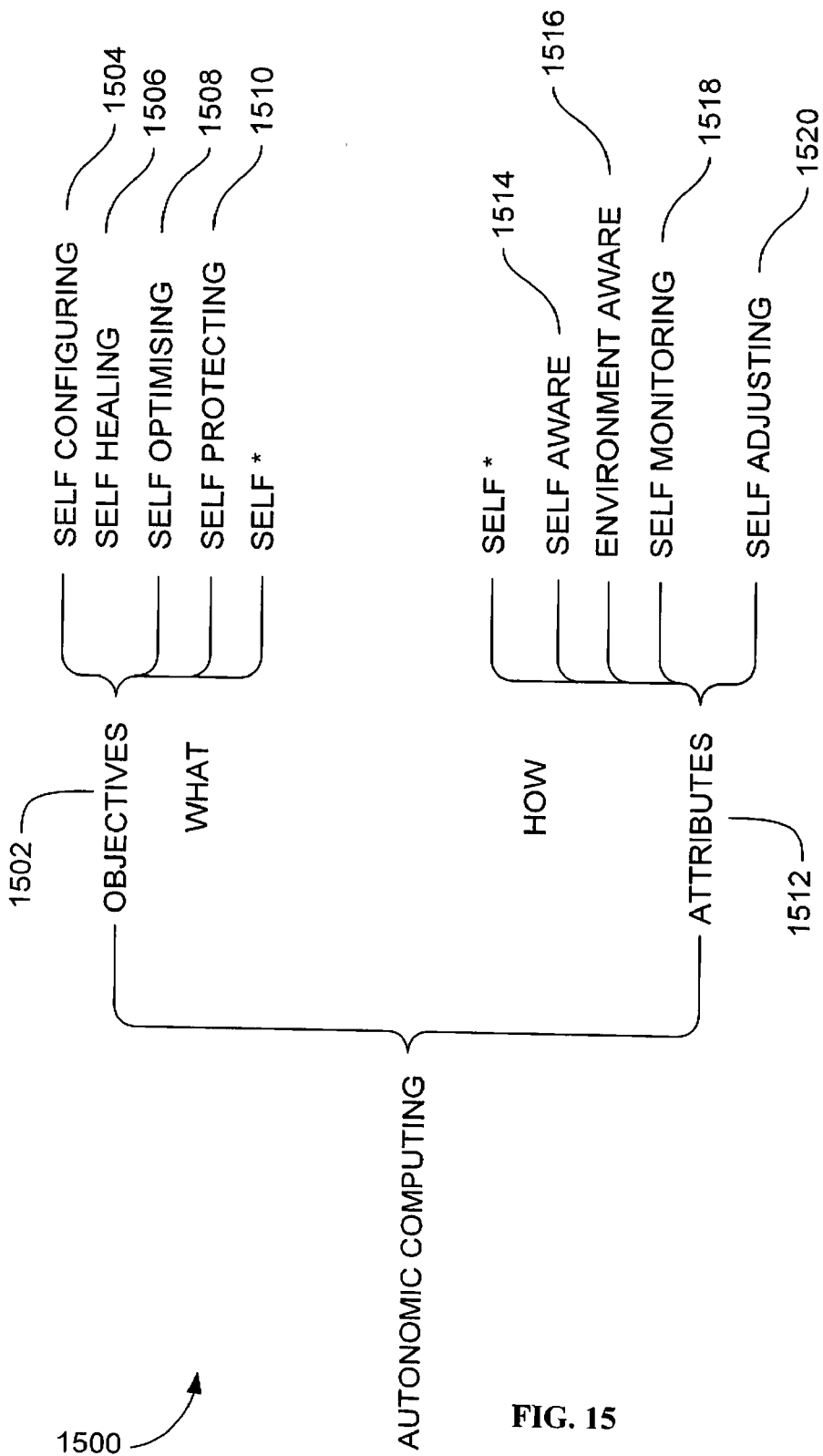
FIG. 15 is a hierarchical chart of an autonomous entity management system 1500 according to an embodiment.

FIG. 15 is a hierarchical chart of an autonomous entity management system 1500 according to an embodiment. Properties that a system may possess in order to constitute an autonomic system are depicted in the autonomous entity management system 1500.

General properties of an autonomic (self-managing) system may include four objectives defined by International Business Machines 1502: self-configuring 1504, self-healing 1506, self-optimizing 1508 and self-protecting 1510, and four attributes 1512: self-awareness 1514, environment-awareness 1516, self-monitoring 1518 and self-adjusting 1520. One skilled in the art will recognize that other properties also exist. Essentially, the objectives 1502 could represent broad system requirements, while the attributes 1512 could identify basic implementation mechanisms.

Self-configuring 1504 may represent an ability of the system 1500 to re-adjust itself automatically; this can simply be in support of changing circumstances, or to assist in self-healing 1506, self-optimization 1508 or self-protection 1510. Self-healing 1506, in reactive mode, may be a mechanism concerned with ensuring effective recovery when a fault occurs, identifying the fault, and then, where possible, repairing it. In proactive mode, the self-healing 1506 objective may monitor vital signs in an attempt to predict and avoid "health" problems (i.e. reaching undesirable situations).

Self-optimization 1508 may mean that the system 1500 is aware of ideal performance of the system 1500, can measure current performance of the system 1500 against that ideal, and has defined policies for attempting improvements. The system 1500 can also react to policy changes within the system as indicated by the users. A self-protecting 1510 system 1500 can defend the system 1500 from accidental or malicious external attack, which necessitates awareness of potential threats and a way of handling those threats.

Self-managing objectives 1502 may require awareness of an internal state of the system 1500 (i.e. self-aware 1514) and current external operating conditions (i.e. environment-aware 1516). Changing circumstances can be detected through self-monitoring 1518 and adaptations are made accordingly (i.e. self-adjusting 1520). Thus, system 1500 may have knowledge of available resources, components, performance characteristics and current status of the system, and the status of interconnections with other systems, along with rules and policies of therein can be adjusted. Such ability to operate in a heterogeneous environment may require the use of open standards to enable global understanding and communication with other systems.

These mechanisms may not be independent entities. For instance, if an attack is successful, this may include self-healing actions, and a mix of self-configuration and self-optimisation, in the first instance to ensure dependability and continued operation of the system, and later to increase the self-protection against similar future attacks. Finally, these self-mechanisms could ensure there is minimal disruption to users, avoiding significant delays in processing.

Other self* properties have emerged or have been revisited in the context of autonomicity. We highlight a brief sampling of some of these here. Self-* may be self-managing properties, as follows. Self-anticipating is an ability to predict likely outcomes or simulate self-* actions. Self-assembling is an assembly of models, algorithms, agents, robots, etc.; self-assembly is often influenced by nature, such as nest construction in social insects. Self-assembly is also referred to as self-reconfigurable systems. Self-awareness is "know thyself" awareness of internal states; knowledge of past states and operating abilities. Self-chop is the initial four self-properties (Self-Configuration 1504, Self-Healing 1506, Self-Optimisation 1508 and Self-Protection 1510). Self-configuring is an ability to configure and re-configure in order to meet policies/goals. Self-critical is an ability to consider if policies are being met or goals are being achieved (alternatively, self-reflect). Self-defining is a reference to autonomic event messages between Autonomic Managers: contains data and definition of that data-metadata (for instance using XML). In reference to goals/policies: defining these (from self-reflection, etc.). Self-governing is autonomous: responsibility for achieving goals/tasks. Self-healing is reactive (self-repair of faults) and Proactive (predicting and preventing faults). Self-installing is a specialized form of self-configuration—installing patches, new components, etc or re-installation of an operating system after a major crash. Self-managing is autonomous, along with responsibility for wider self-* management issues. Self-optimizing is optimization of tasks and nodes. Self-organizing is organization of effort/nodes; particularly used in networks/communications. Self-protecting is an ability of a system to protect itself. Self-reflecting is an ability to consider if routine and reflex operations of self-* operations are as expected and can involve self-simulation to test scenarios. Self-similar is self-managing components created from similar components that adapt to a specific task, for instance a self-managing agent. Self-simulation is an ability to generate and test scenarios, without affecting the live system. Self-aware is self-managing software, firmware and hardware.

Figure 16:
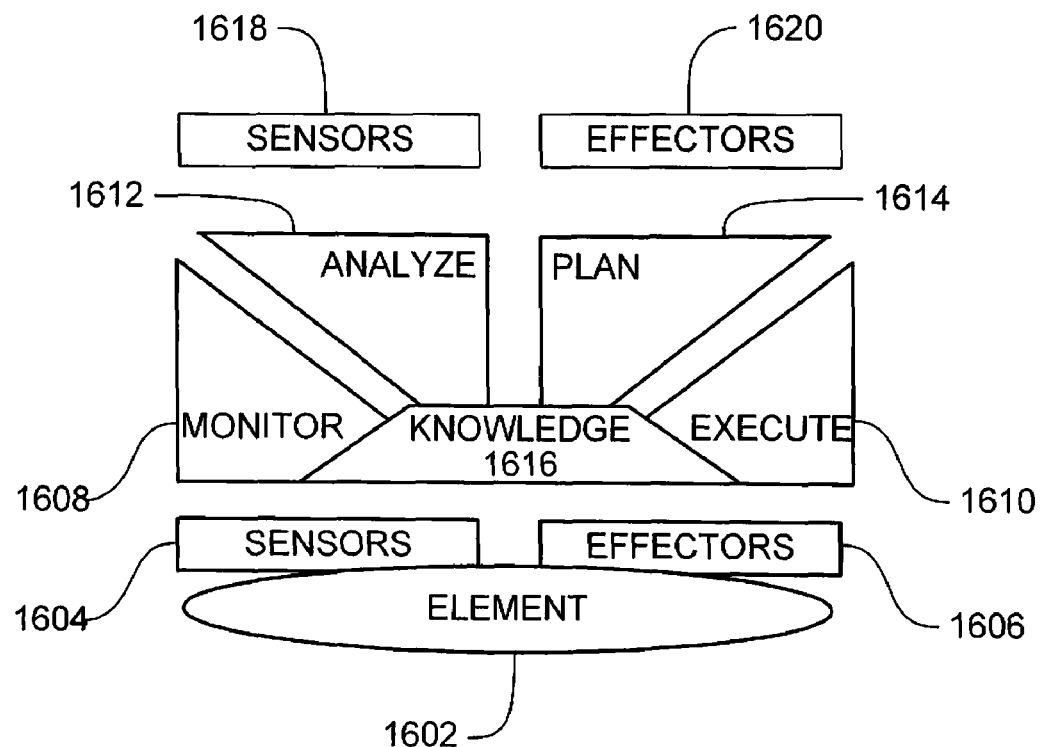
FIG. 16 is a block diagram of an autonomic element according to an embodiment.

FIG. 16 is a block diagram of an autonomic element 1600 according to an embodiment. Autonomic element 1600 may include an element 1602 that is operably coupled to sensors 1604 and effectors 1606.

Autonomic element 1600 may also include components that monitor 1608, execute 1610, analyze 1612 and plan 1614; those components may access knowledge 1616. Those components can interact with sensors 1618 and effectors 1620.

Figure 17:
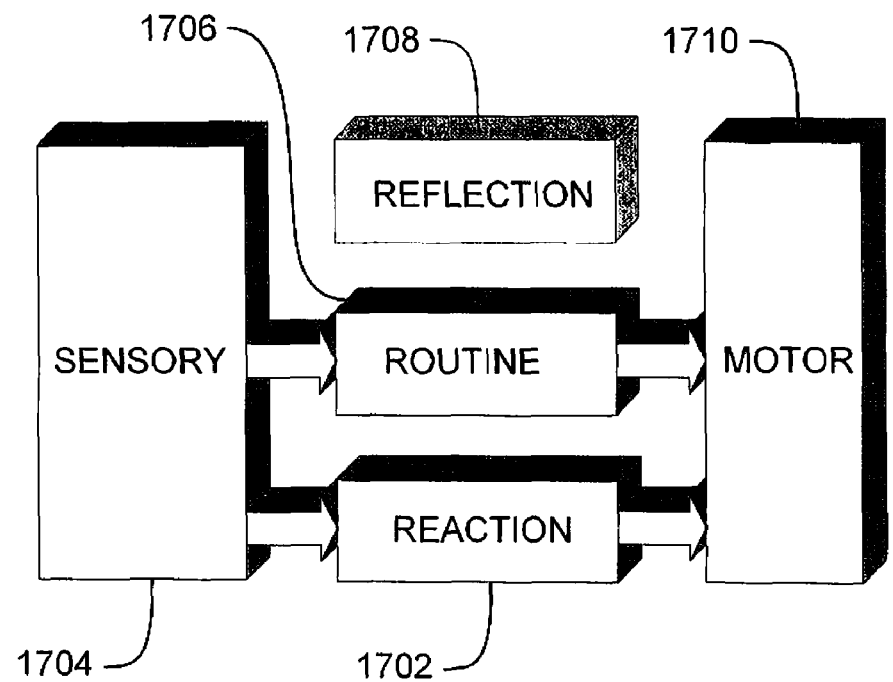
FIG. 17 is a block diagram of autonomy and autonomicity at a high "system" level according to an embodiment.

FIG. 17 is a block diagram of autonomy and autonomicity 1700 at a high "system" level, according to an embodiment. A high level perspective for an intelligent machine design is depicted in FIG. 17. This diagram of autonomy and autonomicity 1700 includes intelligent machine design and system level autonomy and autonomicity.

FIG. 17 describes three levels for the design of intelligent systems:

1) Reaction 1702—the lowest level, where no learning occurs but there is immediate response to state information coming from sensory systems 1704.

2) Routine 1706—middle level, where largely routine evaluation and planning behaviors take place. Input is received from sensory system 1704 as well as from the reaction level and reflection level. This level of assessment results in three dimensions of affect and emotion values: positive affect, negative affect, and (energetic) arousal.

3) Reflection 1708—top level, receives no sensory 1704 input or has no motor 1710 output; input is received from below. Reflection is a meta-process, whereby the mind deliberates about itself. Essentially, operations at this level look at the system's representations of its experiences, its current behavior, its current environment, etc.

As illustrated, input from, and output to, the environment only takes place within the reaction 1702 and routine 1706 layers. One can consider that reaction 1702 level essentially sits within the "hard" engineering domain, monitoring the current state of both the machine and its environment, with rapid reaction to changing circumstances; and, that the reflection 1708 level can reside within an artificial domain utilizing its techniques to consider the behavior of the system and learn new strategies. The routine 1706 level can be a cooperative mixture of both. The high-level intelligent machine design may be appropriate for autonomic systems, as depicted here in FIG. 17, in consideration of the dynamics of responses including reaction 1702 and also for reflection 1708 of self-managing behavior.

As depicted, autonomic computing can reside within the domain of the reaction 1702 layer as a result of a metaphoric link with the autonomic biological nervous system, where no conscious or cognitive activity takes place. Other biologically-inspired computing (also referred to as nature-inspired computing, organic computing, etc.) may provide such higher level cognitive approaches, for instance as in swarm intelligence. Within the autonomic computing research community, autonomicity may not normally be considered to imply this narrower view. Essentially, the autonomic self-managing metaphor can be considered to aim for a user/manager to be able to set high-level policies, while the system achieves the goals. Similar overarching views exist in other related initiatives and, increasingly, they are influencing each other.

In terms of autonomy and autonomicity, autonomy can be considered as being self-governing while autonomicity can be considered self-managing. At the element level, an element may have some autonomy and autonomic properties, since to self-manage implies some autonomy, while to provide a dependable autonomous element requires such autonomic properties as self-healing along with the element's self-directed task. From this perspective, it would appear that the separation of autonomy and autonomicity as characteristics will decrease in the future and eventually will become negligible. On the other hand, at the system level if one considers again the three tiers of the intelligent machine design (reaction 1702, routine 1706, and reflection 1708) and accepts the narrower view of autonomicity, there is a potential correlation between the levels. That is, the reaction 1702 level correlates with autonomicity, and the reflection 1708 level correlates with autonomy; autonomy as in self-governing of the self-managing policies within the system.

Figure 18:
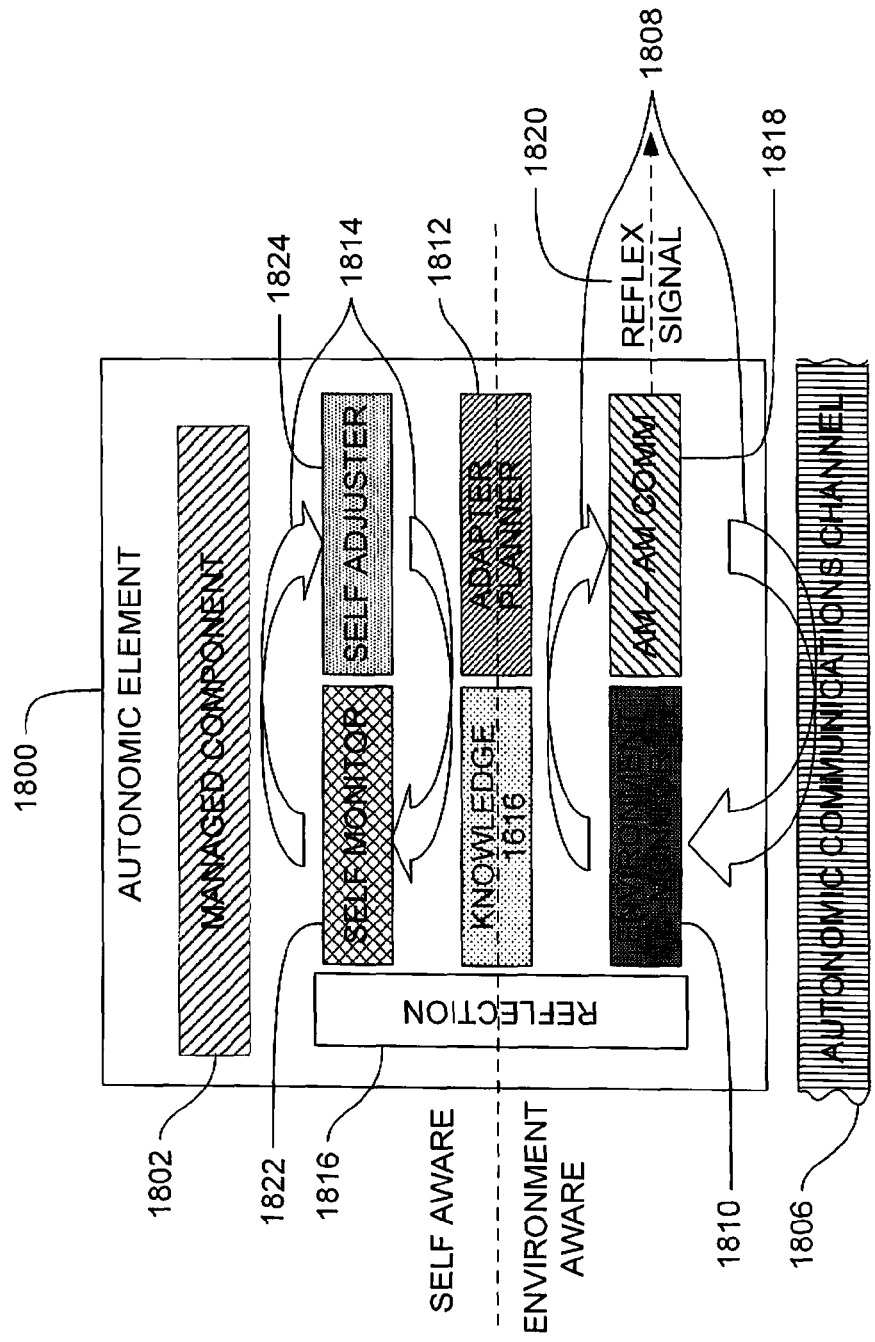
FIG. 18 is a block diagram of an architecture of an autonomic element (AE) 1800 according to an embodiment that includes reflection and reflex layers.

FIG. 18 is a block diagram of an architecture of an autonomic element (AE) 1800 according to an embodiment that includes reflection and reflex layers. The autonomic element 1800 may include a managed component (MC) 1802 that is managed, and the autonomic element 1800 may further include an autonomic manager (AM), no shown. The AM may be responsible for the MC 1802 within the AE 1800. The AM can be designed as part of the component or provided externally to the component, as an agent, for instance. Interaction of the autonomic element 1800 can occur with remote (external) autonomic managers (cf. the autonomic communications channel 1806) through virtual, peer-to-peer, client-server or grid configurations.

An important aspect of the architecture of many autonomic systems can be sensors and effectors, such as those shown in FIG. 16. A control loop 1808 can be created by monitoring 1810 behavior through sensors, comparing this with expectations (knowledge 1616, as in historical and current data, rules and beliefs), planning 1812 what action is necessary (if any), and then executing that action through effectors. The closed loop of feedback control 1808 can provide a basic backbone structure for each system component. FIG. 18 describes at least two control loops in the autonomic element 1800, one for self-awareness 1814 and another 1808 for environmental awareness.

In some embodiments, the self-monitor/self-adjuster control loop 1814 can be substantially similar to the monitor, analyze, plan and execute (MAPE) control loop described in FIG. 16. The monitor-and-analyze parts of the structure can perform a function of processing information from the sensors to provide both self-awareness 1814 and an awareness 1808 of the external environment. The plan-and-execute parts can decide on the necessary self-management behavior that will be executed through the effectors. The MAPE components can use the correlations, rules, beliefs, expectations, histories, and other information known to the autonomic element, or available to it through the knowledge repository 1616 within the AM 1804.

A reflection component 1816 may perform analysis computation on the AE 1800 (cf. the reflection component 1816 within the autonomic manager). In terms of an autonomic system, reflection can be particularly helpful in order to allow the system to consider the self-managing policies, and to ensure that the policies are being performed as expected. This may be important since autonomicity involves self-adaptation to the changing circumstances in the environment. An autonomic manager communications (AM/AM) component 1818 can also produce a reflex signal 1820. A self adjuster 1824 can be operably coupled to a self monitor 1822 in the self control loop 1814.

Method Embodiments

In the previous section, apparatus embodiments are described. In this section, the particular methods of such embodiments are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware can also be composed of computer-executable instructions. In some embodiments, method 1900 may be performed by a program executing on, or performed by firmware or hardware that is a part of a computer, such as computer 802 in FIG. 8.

Figure 19:
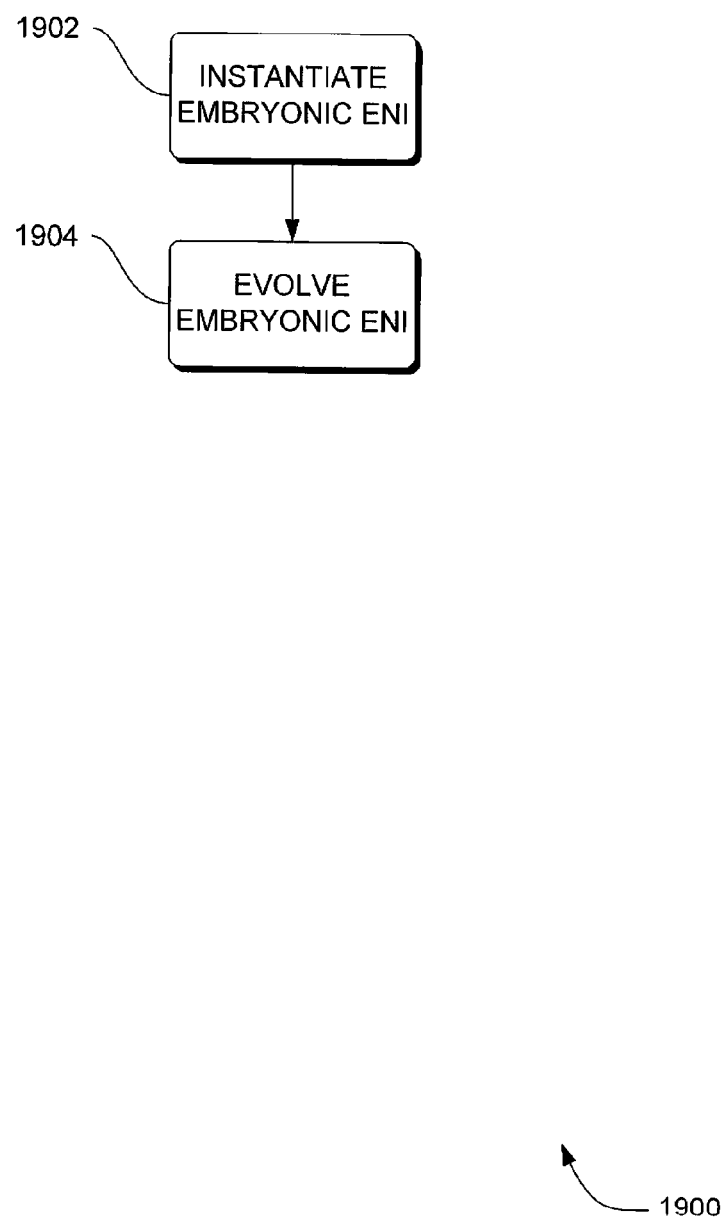
FIG. 19 is a flowchart of a method to construct an environment to satisfy increasingly demanding external requirements according to an embodiment.

FIG. 19 is a flowchart of a method 1900 to construct an environment to satisfy increasingly demanding external requirements according to an embodiment.

Method 1900 may include instantiating 1902 an embryonic evolvable neural interface (ENI), such as inter-ENI 106. In one embodiment, the embryonic ENI lacks a complete specification of the operational characteristics of the ESNS or an ENI. The embryonic ENI can be a neural thread possessing only the most primitive and minimal connectivity.

Method 1900 can further include evolving 1904 the embryonic ENI towards complex complete connectivity. Specifications of the inter-ENI 106 can be developed from the initial embryonic form. Thus a very complex problem, that in some embodiments may be represented by a complete specification, can be replaced by a more simple specification of the embryonic ENI that is evolved to meet increasingly demanding requirements. Progression from an embryonic state to a more complex state can avoid the necessity of specifying the complex complete connectivity initially, but rather can reduce the problem to one of developing methods to drive the evolution of simple limited connectivity to complex complete connectivity.

An adaptive or evolutionary nature of an artificial intelligence construct in method 1900 can be predicated on an active revision of the embryonic ENI to meet external action requirements for a sensory input. In particular, the ENI, which handles both the intra-NBF and inter-NBF connectivity, can evolve due to changing conditions that may be driven either by training requirements or operational requirements.

In other embodiments, method 1900 may be implemented as a computer-accessible medium having executable instructions capable of directing a processor, such as processor 804 in FIG. 8, to perform the respective method. In varying embodiments, the medium can be a magnetic medium, an electronic medium, or an optical medium.

Figure 20:
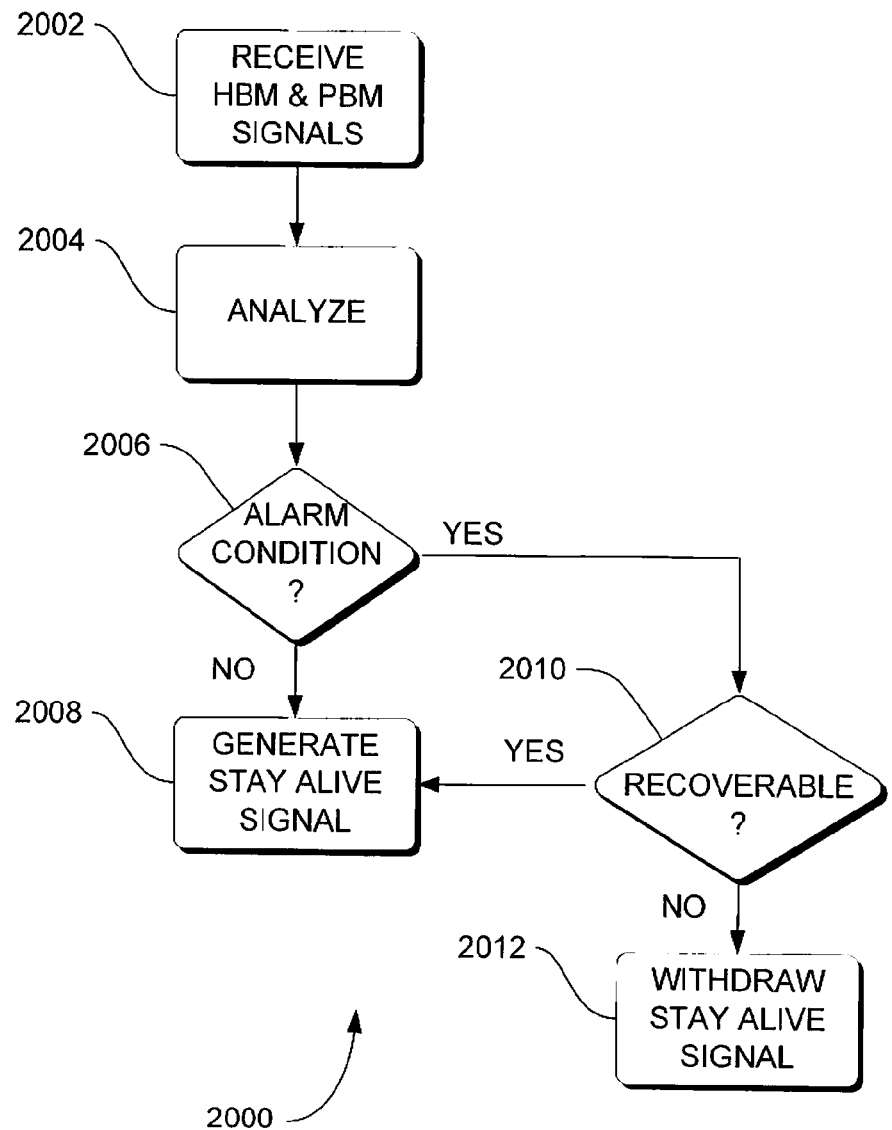
FIG. 20 is a flowchart of a method to construct an environment to satisfy increasingly demanding external requirements according to an embodiment where a ruler entity decides to withdraw or generate a stay alive signal.

FIG. 20 is a flowchart of a method 2000 to construct an environment to satisfy increasingly demanding external requirements according to an embodiment where a ruler entity decides to withdraw or generate a stay alive signal. Method 2000 may solve the need in the art for management of autonomous entities that can be functionally extracted from an environment upon the occurrence of a predetermined condition. Method 2000 can begin with action 2002 when receiving a signal from a managed entity.

Action 2002 can receive a heart beat monitor (HBM) signal and pulse monitor (PBM) signal from a managed entity such as worker entities 1318 or 1320. The HBM signal can be an indication that the managed entity (worker entity) is operating. The HBM can be an "ON/OFF" state signal, an indication that a process is being performed, or any other signal that can convey information that the worker entity is alive or active. The PBM signal may extend the HBM signal to incorporate reflex/urgency/health indicators from the autonomic manager representing its view of the current self-management state. The PBM signal can thus convey the performance and characteristics of the entity in the form of engineering data summarization to add context to the received HBM signal. Engineering data summarization can be a set of abstractions regarding sensors that may comprise rise and fall of data by a certain amount, external causes for parameter deviations, actual numerical value of the parameters being summarized, warning conditions, alarm conditions, and any other summarization that would convey the general health of the system. Once the HBM and PBM signals have been received, control can be forwarded to action 2004 for further processing.

In action 2004, an analysis of the HBM and PBM signal may be performed to determine trends and possible areas of concern. Some purposes of the analysis may be to determine exceedance from a predetermined condition, make projection through simulation and data modeling areas of parameters that can lead to the failure of the worker entity or that might jeopardize the assigned mission, and ascertain the quality of performance of the system. The analysis can be performed by using regression techniques, neural network techniques, statistical techniques, or any other technique that can convey information about the state of a system or emergent behavior of the system. Once the analysis has been performed, control can pass to action 2006 for further processing.

In action 2006, an alarmed condition may be determined. In action 2006, the analysis of action 2004 may be consulted to determine if there is one or more alarm conditions that can trigger the withdrawal of a stay alive signal. If it is determined that there are no alarm conditions, control may be passed to action 2008 so as to generate a stay alive signal. In the event that an alarm condition is present, control may be passed to action 2010 for further processing.

In action 2010, a determination may be made to ascertain whether the identified alarmed condition of action 2006 is recoverable by the managed entity, such as worker entities 1318 and 1320 of FIG. 13. When an alarmed condition is determined to be recoverable, control may be passed to action 2008 to generate a stay alive signal. When an alarmed condition is determined not to be recoverable, control may be passed to action 2012 to withdraw the stay alive signal.

Figure 21:
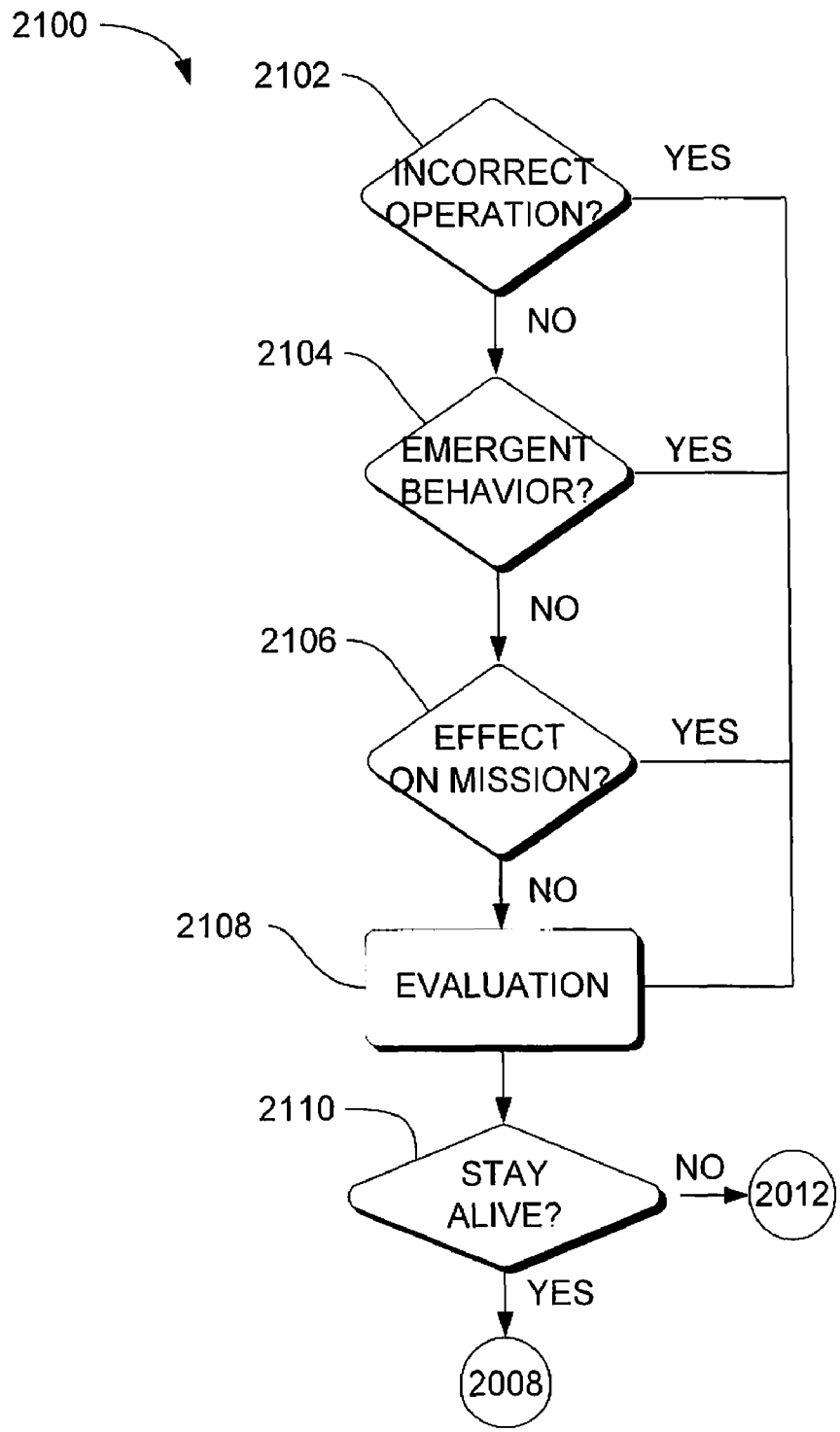
FIG. 21 is a flowchart for generating stay alive signal when a warning condition occurs according to an embodiment.

FIG. 21 is a flowchart of a method 2100 for ascertaining the recoverability of an alarmed conditioned determined at action 2006 according to an embodiment. Method 2100 may solve the need in the art for management of autonomous entities that can be functionally extracted from an environment upon the occurrence of a predetermined condition. Method 2100 may begin with action 2102 when receiving one or more alarmed condition.

In action 2102, there may be a determination if an incorrect operation from the managed system has been identified in action 2004 of FIG. 20. An incorrect operation can range from not initializing sensors to failing to self-heal when internal decision logic recommends as an appropriate cause of action. In action 2102, in addition to determining if an incorrect operation has been identified, it may also be possible to ascertain the number of devices or processes within the entity that registered an incorrect operation. If at least one incorrect operation is determined, the action may transfer the identity of the unit to evaluation block 2108 for further processing.

In action 2104, there may be a determination whether emergent behavior from the managed system has been identified in action 2004 of FIG. 20. An emergent behavior or emergent property can appear when a number of entities (agents) operate in an environment forming behaviors that are more complex as a collective. The property itself can often be unpredictable and unprecedented, and can represent a new level of the system's evolution. This complex behavior in the context of control system may be known as non-linearity, chaos, or capacity limits. The complex behavior or properties may not be properties of any single such entity, nor can they easily be predicted or deduced from behavior in the lower-level entities. One reason why emergent behavior occurs may be that the number of interactions between autonomic components of a system increases combinatorially with the number of autonomic components, thus potentially allowing for many new and subtle types of behavior to emerge. Nothing may directly command the system to form a pattern, but the interactions of each part (entities) to its immediate surroundings may cause a complex process that leads to order. Emergent behavior can be identified based on parameters that give rise to the complex behavior in a system such as demands on resources. Once an emergent behavior condition has been identified, the information may be forwarded to evaluation block 2108 for further processing.

In action 2106, a determination may be made of alarm conditions that can have an impact on the success of the mission or task by which all entities are striving to accomplish. The impact could be the ability to accomplish individual tasks or the potential for failure of the overall mission by permitting an entity to stay alive. This impact can be determined through Bayesian belief networks, statistical inference engines, or by any other presently developed or future developed inference engine that can ascertain the impact on a particular task if one or more agent is showing incorrect operation or harmful emergent behavior. Once the impact has been determined, the information may passed to evaluation block 2108 for further processing.

Evaluation block 2108 may marshal the incorrect operation identified in action 2102, the emergent behavior in action 2104, or the effect on mission in action 2106 to suggest a course of action that the managed entities should adopt, which in the present arrangement is based on a stay alive signal. The determination of withdrawing or affirming the stay alive signal can be based on the occurrence of one or more of the identified alarmed conditions, or a combination of two or more of the identified alarmed conditions. For example, the stay alive signal could be withdrawn if there is emergent behavior and there would be an effect on the mission. In the alternative, the stay alive signal could be affirmed if there was only emergent behavior, or incorrect operation. Once the evaluation is determined, control may be passed to decision block 2110 for further processing in accordance to the decision made in evaluation block 2108.

In action 2110, if the desired control instruction is to maintain the stay alive signal, control can be passed to action 2008 for further processing. In the alternative, a withdrawal of the stay alive signal can be sent to action 2012 for further processing. It should be noted that generating a stay alive signal may be equivalent to generating a stay alive signal, affirming a stay alive signal, not withdrawing a stay alive signal, or any other condition that can determine if an entity is to perish or to extinguish unless allowed to continue by another entity. The other entity might be a managing entity since it can determine the outcome (life or death) of an entity.

Figure 22:
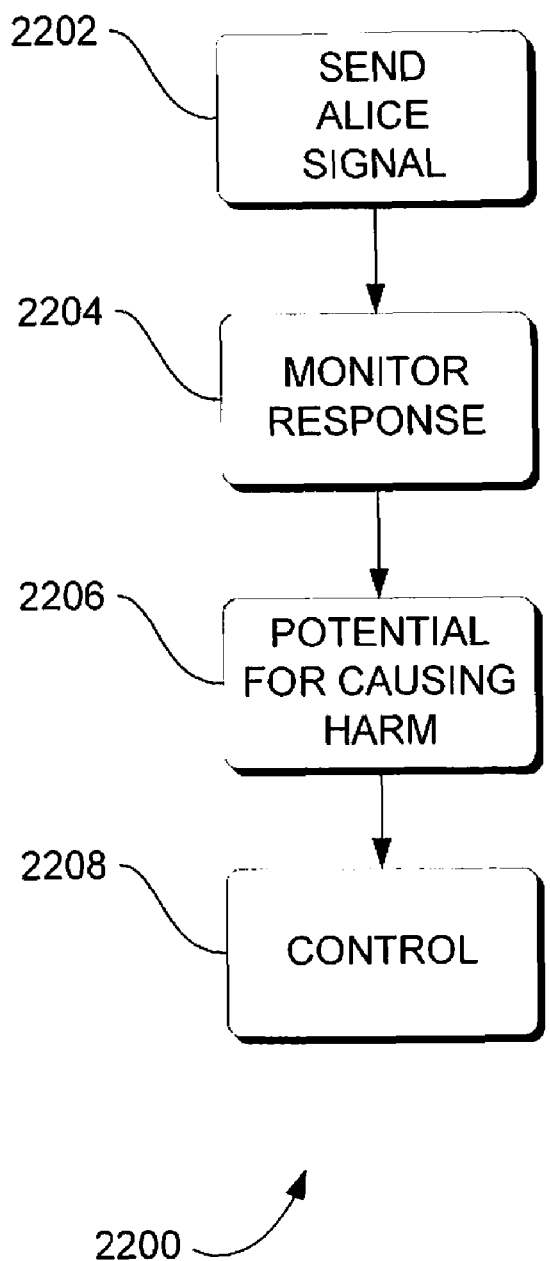
FIG. 22 is a flowchart for interrogating an anonymous autonomic agent according to an embodiment.

FIG. 22 is a flowchart of a method 2200 for providing security requirements according to an embodiment where a ruler entity decides to withdraw or generate a stay alive signal from an anonymous agent. Method 2200 may solve the need in the art for management of autonomous entities that can be functionally extracted from an environment upon the occurrence of a predetermined condition. Method 2200 may begin with action 2202, where an ALice signal is sent to an anonymous agent to ascertain the agents potential for harm to a system as shown in FIG. 21. After the ALice signal has been sent to the agent, control may be passed to action 2204 for further processing.

In action 2204, the response from the agent may be monitored. Monitored as used herein refers to maintaining regular surveillance, or close observation, over an anonymous agent and can include the absence of a signal. For example, not responding with a timeout period is considered, as used herein, as monitor response. After action 2204 is completed, control may be passed to action 2206 for further processing.

In action 2206, the monitored response from action 2204 may be analyzed to determine if it is in an appropriate format, within a certain timeout period, and with a valid and justified reason for being within the locust of interest or domain of the autonomous system 2104 as shown in FIG. 21. Once the potential for causing harm has been ascertained, control may be passed to action 2208 for further processing.

In action 2208, the system may control the future of the anonymous agent based on the potential for harm to the autonomous system. This mimics the mechanism of cell death in the human (and animal) body, and hence makes use of autonomic and other biologically inspired metaphors. The technique would send self-destruct signals to agents that can be compromised, or which cannot be identified as friendly or as having a right to access certain resources. The concept of the ALice signal is to challenge a mobile agent to determine if it is friendly and has permission to access certain resources. If it fails to identify itself appropriately following an ALice interrogation, it may be blocked from the system and given either a self-destruct signal, or its stay alive reprieve may be withdrawn.

Figure 23:
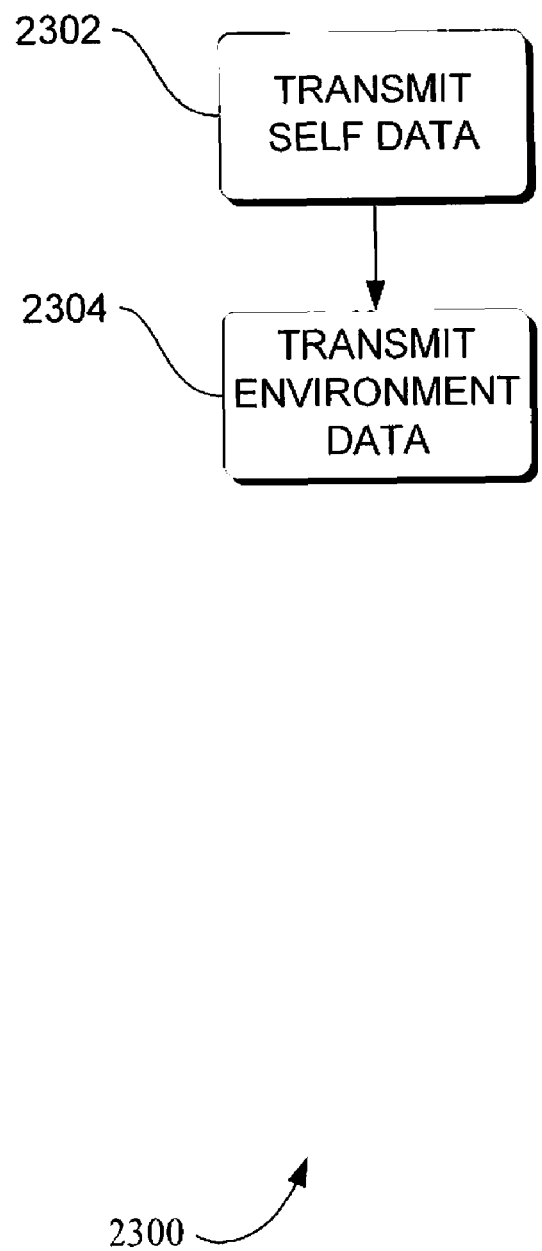
FIG. 23 is a flowchart of a method of autonomic communication by an autonomic element.

FIG. 23 is a flowchart of a method 2300 of autonomic communication by an autonomic element. Method 2300 can offer a holistic vision for the development and evolution of computer-based systems that brings new levels of automation and dependability to systems, while simultaneously hiding their complexity and reducing their total cost of ownership.

Method 2300 may include transmitting self health/urgency data 2302. Examples of the self health/urgency data may include such information as describing low battery power and/or failed sensors. Method 2200 may also include transmitting 2304 environment health/urgency data. Examples of the environment health/urgency data may include information describing inaccessible devices, unauthorized access, and/or an unidentified mobile agent sending communication signals.

Transmitting 2302 and 2304 can be performed in any order relative to each other. For example, in one embodiment the transmitting 2302 self health/urgency data may be performed before transmitting 2304 environment health/urgency data. In another embodiment, transmitting 2304 environment health/urgency data may be performed before transmitting 2302 self health/urgency data. In yet another embodiment, the self health/urgency data may be transmitted simultaneously with the environment health/urgency data. For example, the environment health/urgency data and the self health/urgency data may be transmitted together. One example of transmitting the environment health/urgency data and the self health/urgency data together may include encapsulating the environment health/urgency data and the self health/urgency data in a X.25 packet, although one skilled in the art will readily recognize that any number of alternative packet types may be used that fall within the scope of this invention. The environment health/urgency data and the self health/urgency data can be thought of together as the "lub-dub" of a heartbeat in which the two "beats" or two pieces of data are transmitted simultaneously. The X.25 standard is published by the ITU Telecommunication Standardization Sector at Place des Nations, CH-1211 Geneva 20, Switzerland.

An autonomic environment may require that autonomic elements and, in particular, autonomic managers communicate with one another concerning self-* activities, in order to ensure the robustness of the environment. A reflex signal 1820 of FIG. 18 above can be facilitated through the pulse monitor (PBM). A PBM can be an extension of the embedded system's heart-beat monitor, or HBM, which safeguards vital processes through the emission of a regular "I am alive" signal to another process with the capability to encode self health/urgency data and environment health/urgency data as a single pulse. HBM is described in greater detail in FIGS. 12, 13 and 20 above. Together with the standard event messages on an autonomic communications channel, this may provide dynamics within autonomic responses and multiple loops of control, such as reflex reactions among the autonomic managers. Some embodiments of the autonomic manager communications (AM/AM) component 1818 may produce a reflex signal 1820 that includes the self health/urgency data and the environment health/urgency data in addition to the HBM. More concisely, the reflex signal can carry a PBM. A reflex signal that carries a PBM can be used to safe-guard the autonomic element by communicating health of the autonomic element to another autonomic unit. For instance, in the situation where each PC in a LAN is equipped with an autonomic manager, rather than each of the individual PCs monitoring the same environment, a few PCs (likely the least busy machines) can take on this role and alert the others through a change in pulse to indicate changing circumstances.

An important aspect concerning the reflex reaction and the pulse monitor is the minimization of data sent—essentially only a "signal" may be transmitted. Strictly speaking, this is not mandatory; more information can be sent, yet the additional information should not compromise the reflex reaction.

Just as the beat of a heart has a double beat (lub-dub), the autonomic element's pulse monitor can have a double beat encoded—as described above, a self health/urgency measure and an environment health/urgency measure. These match directly with the two control loops within the AE, and the self-awareness and environment awareness properties.

Figure 24:
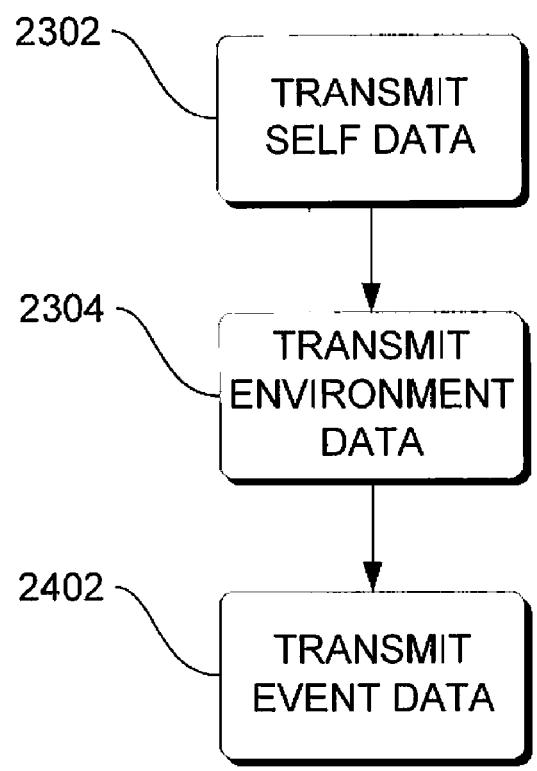
FIG. 24 is a flowchart of a method of autonomic communication by an autonomic element.

FIG. 24 is a flowchart of a method 2400 of autonomic communication by an autonomic element. Method 2400 may include transmitting 2402 event message data in addition to the self and environment health/urgency data. Event message data can include data describing a change in condition, or a deviation from a normal operation. Event message data is described in more detail above in FIG. 13.

In some embodiments, the self health/urgency data and environment health/urgency data encoded with the standard event messages on an autonomic communications channel may provide dynamics within autonomic responses and multiple loops of control, such as reflex reactions among an autonomic manager.

Figure 25:
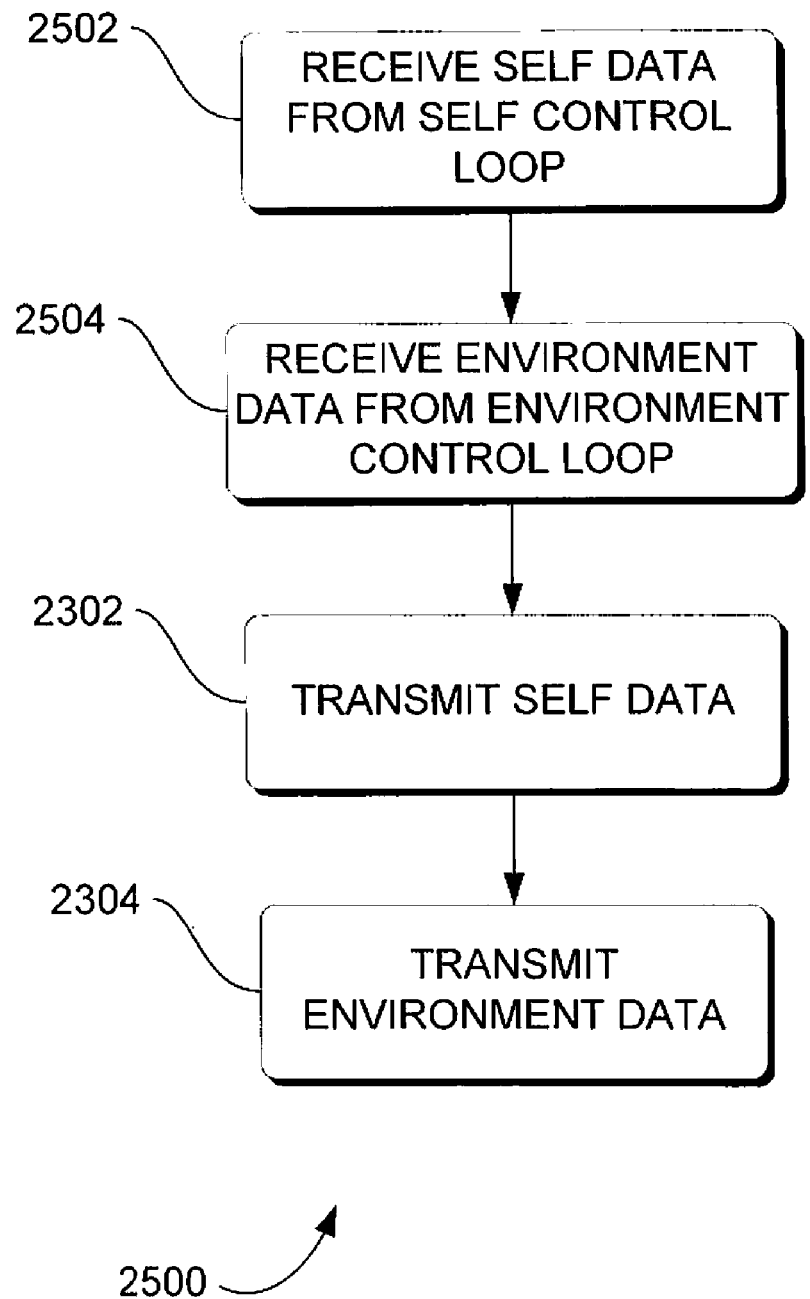
FIG. 25 is a flowchart of a method of autonomic communication by an autonomic element.

FIG. 25 is a flowchart of a method 2500 of autonomic communication by an autonomic element. Method 2500 may include receiving 2502 the self health/urgency data from a self control loop component of the autonomic element. One example of the self control loop component of the autonomic element may be the self awareness control loop 1814 of the autonomic element 1800 of FIG. 18 above.

Method 2500 may also include receiving 2504 the environment health/urgency data from an environment control loop component of the autonomic element. One example of the environment control loop component of the autonomic element may be the environment awareness control loop 1808 of the autonomic element 1800 of FIG. 18 above.

Figure 26:
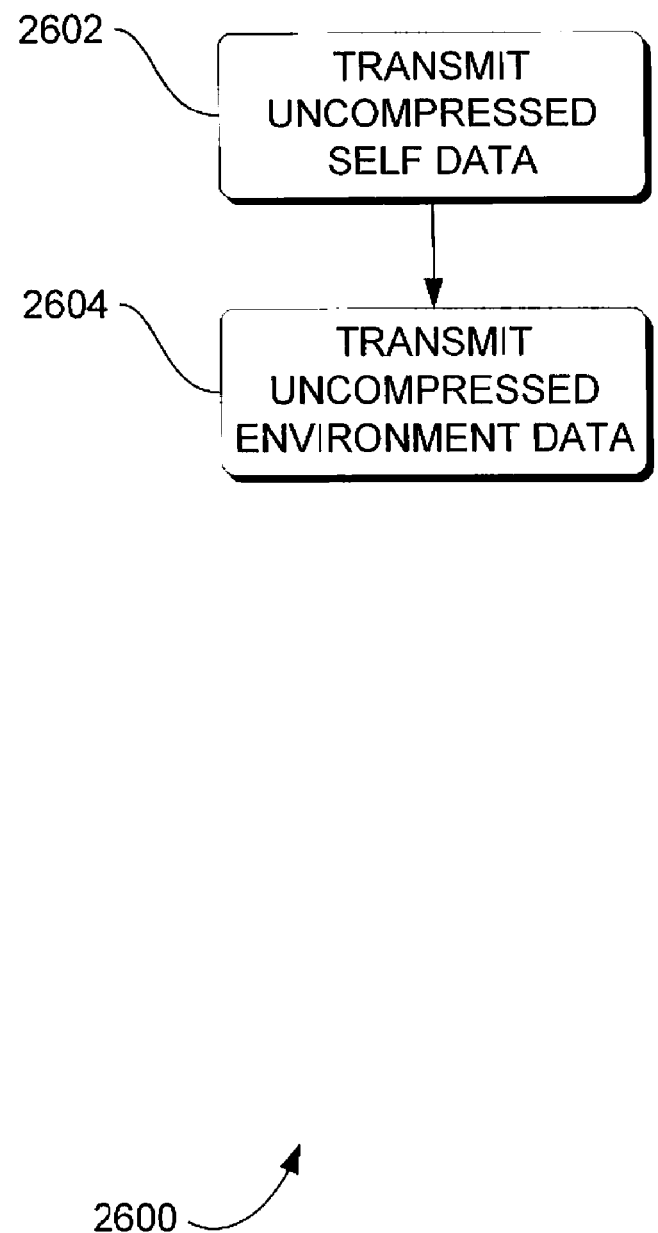
FIG. 26 is a flowchart of a method of autonomic communication by an autonomic element.

FIG. 26 is a flowchart of a method 2600 of autonomic communication by an autonomic element. Method 2600 may offer a holistic vision for the development and evolution of computer-based systems that brings new levels of automation and dependability to systems, while simultaneously hiding their complexity and reducing processing delays by systems that receive data from the autonomic element.

Method 2600 may include transmitting uncompressed self health/urgency data 2602. Method 2200 may also include transmitting 2604 uncompressed environment health/urgency data. In the absence of bandwidth concerns, the uncompressed data can be acted upon quickly and not incur processing delays. One important aspect may be that the data, whether uncompressed or sent in some other form, should be in a form that can be acted upon immediately and not involve processing delays (such as is the case of event correlation). Transmitting 2602 and 2604 can be performed in any order relative to each other.

CONCLUSION

A reflex reaction component—the pulse monitor—can be used to encode and transmit health/urgency signals of the element (self) or the environment. The self and environmental values can be transmitted together. Self-managing systems, whether viewed from the autonomic computing perspective, or from the perspective of another initiative, can offer a holistic vision for the development and evolution of computer-based systems that aims to bring new levels of automation and dependability to systems, while simultaneously hiding their complexity and reducing their total cost of ownership.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all environments and alternate technologies which provide the same functionality as described herein.

We claim:

1. A computer-accessible medium having executable instructions for managing a system based on functioning state and operating status of the system, the computer-accessible medium comprising computer executable code for a processor to:

process received signals from the system indicative of the functioning state and the operating status to obtain an analysis of the condition of the system;

generate at least one stay alive signal based on the condition of the system;

transmit the at least one stay-alive signal;

transmit a lub-dub signal, the lub-dub signal comprising a pulse monitor signal and a reflex signal, the pulse monitor signal comprising self health/urgency data, the reflex signal comprising environment health/urgency data, whereby the lub-dub signal further comprises at least one of an urgency signal, an environmental condition, and an event condition, wherein the event condition is at least one of incorrect operation, emergent behavior, and failure to perform self-managing, such that the processor monitors and directs the system.

2. The computer-accessible medium of claim 1, wherein a stay alive signal is at least one of withdraw a stay alive signal, initiate a self-destruct sequence, and continue to stay alive.

3. The computer-accessible medium of claim 1, the medium further comprising:
receiving the self health/urgency data from a self control loop component of the autonomic element; and
receiving the environment health/urgency data from a environment control loop component of the autonomic element.

4. The computer-accessible medium of claim 1, wherein the self health/urgency data further comprises uncompressed self health/urgency data, and wherein the environment health/urgency data further comprises uncompressed environment health/urgency data.

5. The computer-accessible medium of claim 1, wherein the transmitting self health/urgency data and transmitting environment health/urgency data occurs simultaneously.

6. An autonomic element, the autonomic element comprising:
a self monitor that is operable to receive information from sensors and operable to monitor and analyze the sensor information and access a knowledge repository;
a self adjuster operably coupled to the self monitor in a self control loop, the self adjuster operable to access the knowledge repository, the self adjuster also operable to transmit data to effectors, and the self adjuster further operable to plan and execute;
an environment monitor that is operable to receive information from sensors and operable to monitor and analyze the sensor information and access the knowledge repository; and
an autonomic manager communications component operably coupled to the environment monitor in an environment control loop, the autonomic manager communications component operable to access the knowledge repository, the autonomic manager communications component operable to produce and transmit a lub-dub signal, the lub-dub signal comprising a pulse monitor signal and a reflex signal, the pulse monitor signal comprising self health/urgency data, the self health/urgency data comprising a heart beat monitor signal, the reflex signal comprising environment health/urgency data, whereby the lub-dub signal further comprises at least one of an urgency signal, an environmental condition, and an event condition, wherein the event condition is at least one of incorrect operation, emergent behavior, and failure to perform self-managing,
such that the autonomic element monitors and directs information from the sensors.

7. The autonomic element of claim 6,
wherein the self health/urgency data further comprises uncompressed self health/urgency data, and
wherein the environment health/urgency data further comprises uncompressed environment health/urgency data.

8. The autonomic element of claim 6, wherein the autonomic manager communications component is further operable to transmit the environment health/urgency data and the self health/urgency data together.

9. The autonomic element of claim 8, wherein the autonomic manager communications component is further operable to encapsulate the environment health/urgency data and the self health/urgency data in a packet.

10. The autonomic element of claim 6, wherein a stay alive signal is at least one of withdraw a stay alive signal, initiate a self-destruct sequence, and continue to stay alive.

11. The autonomic element of claim 6, wherein the self health/urgency data further comprises uncompressed self health/urgency data, and wherein the environment health/urgency data further comprises uncompressed environment health/urgency data.

12. The autonomic element of claim 6, wherein the transmitting self health/urgency data and transmitting environment health/urgency data occurs simultaneously.

13. An autonomic element, the autonomic element comprising:
a self monitor that is operable to receive information from sensors and operable to monitor and analyze the sensor information and access a knowledge repository;
a self adjuster operably coupled to the self monitor in a self control loop, the self adjuster operable to access the knowledge repository, the self adjuster also operable to transmit data to effectors, and the self adjuster further operable to plan and execute;
an environment monitor that is operable to receive information from sensors and operable to monitor and analyze the sensor information and access the knowledge repository; and
an autonomic manager communications component operably coupled to the environment monitor in an environment control loop, the autonomic manager communications component operable to access the knowledge repository, the autonomic manager communications component operable to produce and transmit a stay-alive signal, wherein the stay alive signal is at least one of withdraw a stay alive signal, initiate a self-destruct sequence, and continue to stay alive,
such that the autonomic element monitors and directs information from the sensors.

14. The autonomic element of claim 13,
wherein the self health/urgency data further comprises uncompressed self health/urgency data, and
wherein the environment health/urgency data further comprises uncompressed environment health/urgency data.

15. The autonomic element of claim 14, wherein the autonomic manager communications component is further operable to encapsulate the environment health/urgency data and the self health/urgency data in a packet.

16. The autonomic element of claim 13, wherein the autonomic manager communications component is further operable to transmit the environment health/urgency data and the self health/urgency data together.

17. The autonomic element of claim 13, wherein the transmitting self health/urgency data and transmitting environment health/urgency data occurs simultaneously.

* * * * *